United States Patent
Sutou et al.

(10) Patent No.: US 9,720,879 B2
(45) Date of Patent: Aug. 1, 2017

(54) RECONFIGURABLE CIRCUIT HAVING ROWS OF A MATRIX OF REGISTERS CONNECTED TO CORRESPONDING PORTS AND A SEMICONDUCTOR INTEGRATED CIRCUIT

(75) Inventors: Shinichi Sutou, Yokohama (JP); Ichiro Kasama, Yokohama (JP); Kyoji Sato, Yokohama (JP); Takashi Hanai, Yokohama (JP); Kiyomitsu Katou, Yokohama (JP); Takahiro Kubota, Yokohama (JP); Junji Sahoda, Yokohama (JP)

(73) Assignee: Cypress Semiconductor Corporation, San Jose, CA (US)

( * ) Notice: Subject to any disclaimer, the term of this patent is extended or adjusted under 35 U.S.C. 154(b) by 813 days.

(21) Appl. No.: 12/973,730

(22) Filed: Dec. 20, 2010

(65) Prior Publication Data

US 2011/0185152 A1  Jul. 28, 2011

(30) Foreign Application Priority Data

Jan. 27, 2010  (JP) ................................. 2010-015589

(51) Int. Cl.
| | | |
|---|---|---|
| G06F 15/76 | (2006.01) | |
| G06F 15/78 | (2006.01) | |
| G06F 9/30 | (2006.01) | |
| G06F 9/38 | (2006.01) | |

(52) U.S. Cl.
CPC ........ *G06F 15/7867* (2013.01); *G06F 9/3012* (2013.01); *G06F 9/30141* (2013.01); *G06F 9/3877* (2013.01)

(58) Field of Classification Search
CPC ... G06F 9/30141; G06F 9/3012; G06F 9/3877
See application file for complete search history.

(56) References Cited

U.S. PATENT DOCUMENTS 3,621,387 A * 11/1971 Smith et al. ................. 324/73.1
5,093,783 A *  3/1992 Kitada .......................... 711/220
(Continued)

FOREIGN PATENT DOCUMENTS

| JP | 56-068979 A | 6/1981 |
| JP | 62-151957 A | 7/1987 |

(Continued)

OTHER PUBLICATIONS

English-language translation of Final Notice of Reasons for Rejection directed to related Japanese Patent Application No. 2010-015589, mailed Jun. 9, 2014, from Japanese Patent Office; 3 pages.

(Continued)

*Primary Examiner* — Keith Vicary

(57) ABSTRACT

A reconfigurable circuit includes a plurality of processing elements and an input/output data interface unit, and the reconfigurable circuit is configured to control connections of the plurality of processing elements for each context. The input/output data interface unit is configured to hold operation input data which is input to the plurality of processing elements and operation output data which is output from the plurality of processing elements. The input/output data interface unit includes a plurality of ports, and a plurality of registers. The registers are configured to be connected to the plurality of ports, and to include m (m being an integer of 2 or more) number of banks in a depth direction.

21 Claims, 22 Drawing Sheets

(56) References Cited

U.S. PATENT DOCUMENTS

| | | | |
|---|---|---|---|
| 5,680,641 A * | 10/1997 | Sidman | 710/20 |
| 6,134,653 A * | 10/2000 | Roy et al. | 712/228 |
| 7,155,602 B2 * | 12/2006 | Poznanovic | 713/1 |
| 7,613,899 B2 | 11/2009 | Fukatsu | |
| 8,275,973 B2 | 9/2012 | Toi et al. | |
| 2004/0030815 A1 | 2/2004 | Shimura et al. | |
| 2005/0289328 A1 | 12/2005 | Kasama | |
| 2006/0004987 A1 * | 1/2006 | Asaad et al. | 712/34 |
| 2006/0277391 A1 * | 12/2006 | Bittner, Jr. | 712/25 |
| 2007/0083733 A1 * | 4/2007 | Fujisawa et al. | 712/15 |
| 2007/0294517 A1 | 12/2007 | Ayrignac et al. | |
| 2011/0047353 A1 | 2/2011 | Matsuno | |

FOREIGN PATENT DOCUMENTS

| | | |
|---|---|---|
| JP | 03-102557 A | 4/1991 |
| JP | 05-006657 A | 1/1993 |
| JP | 07-141208 A | 6/1995 |
| JP | 2006-011924 A | 1/2006 |
| JP | 2006-236106 A | 9/2006 |
| JP | 2009-003765 A | 1/2009 |
| JP | 2010-002986 A | 1/2010 |
| WO | WO 03/023602 A1 | 3/2003 |
| WO | WO 2009/096482 A1 | 8/2009 |

OTHER PUBLICATIONS

English-Language Abstract for Japanese Patent Publication No. 03-102557 A, published Apr. 26, 1991; 1 page.

English-Language Abstract for Japanese Patent Publication No. 07-141208 A, published Jun. 2, 1995; 1 page.

English-Language Translation of Notice of Reasons for Rejection directed to related Japanese Patent Application No. 2010-015589, mailed Oct. 17, 2013, from the Japanese Patent Office; 3 pages.

* cited by examiner

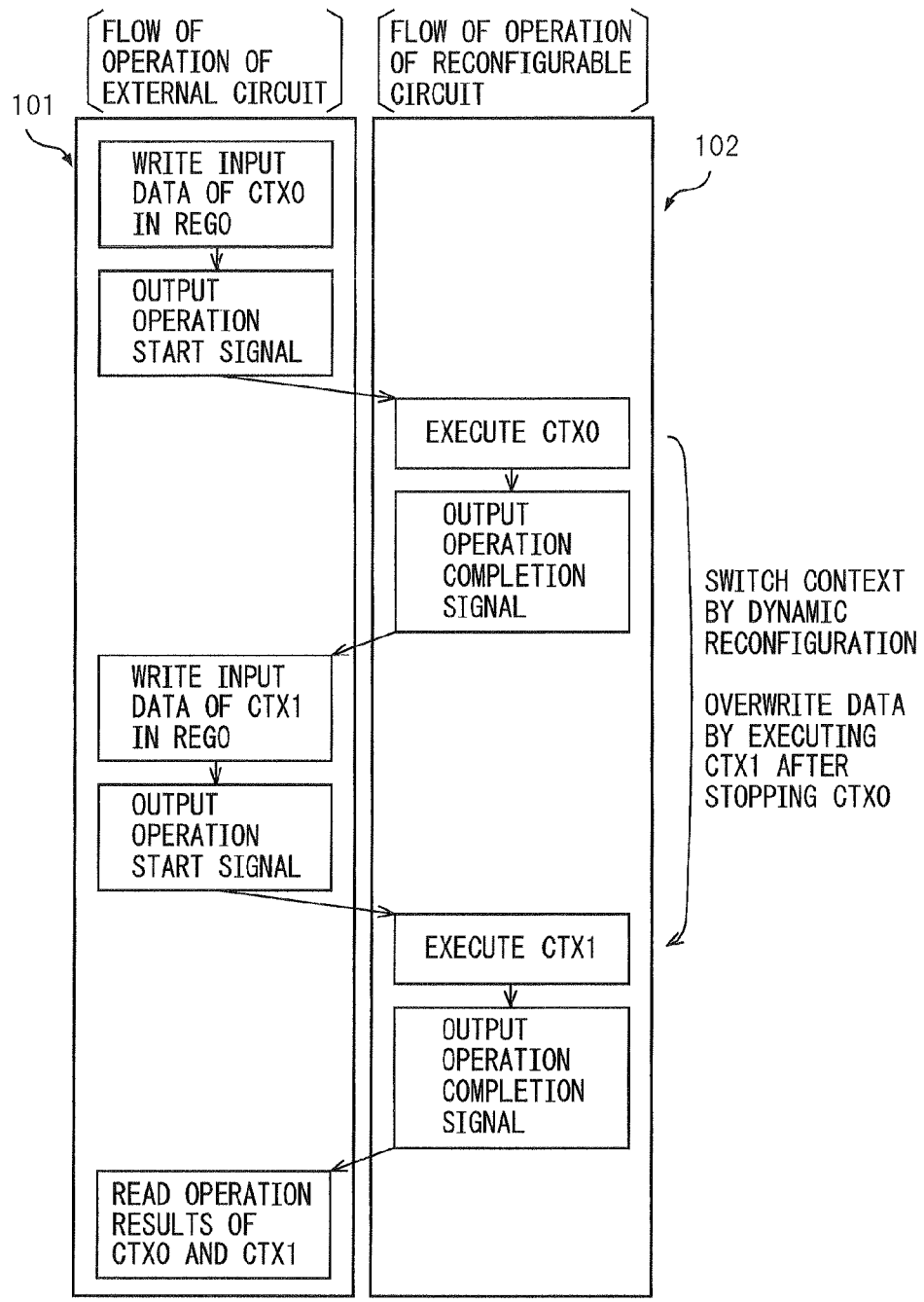

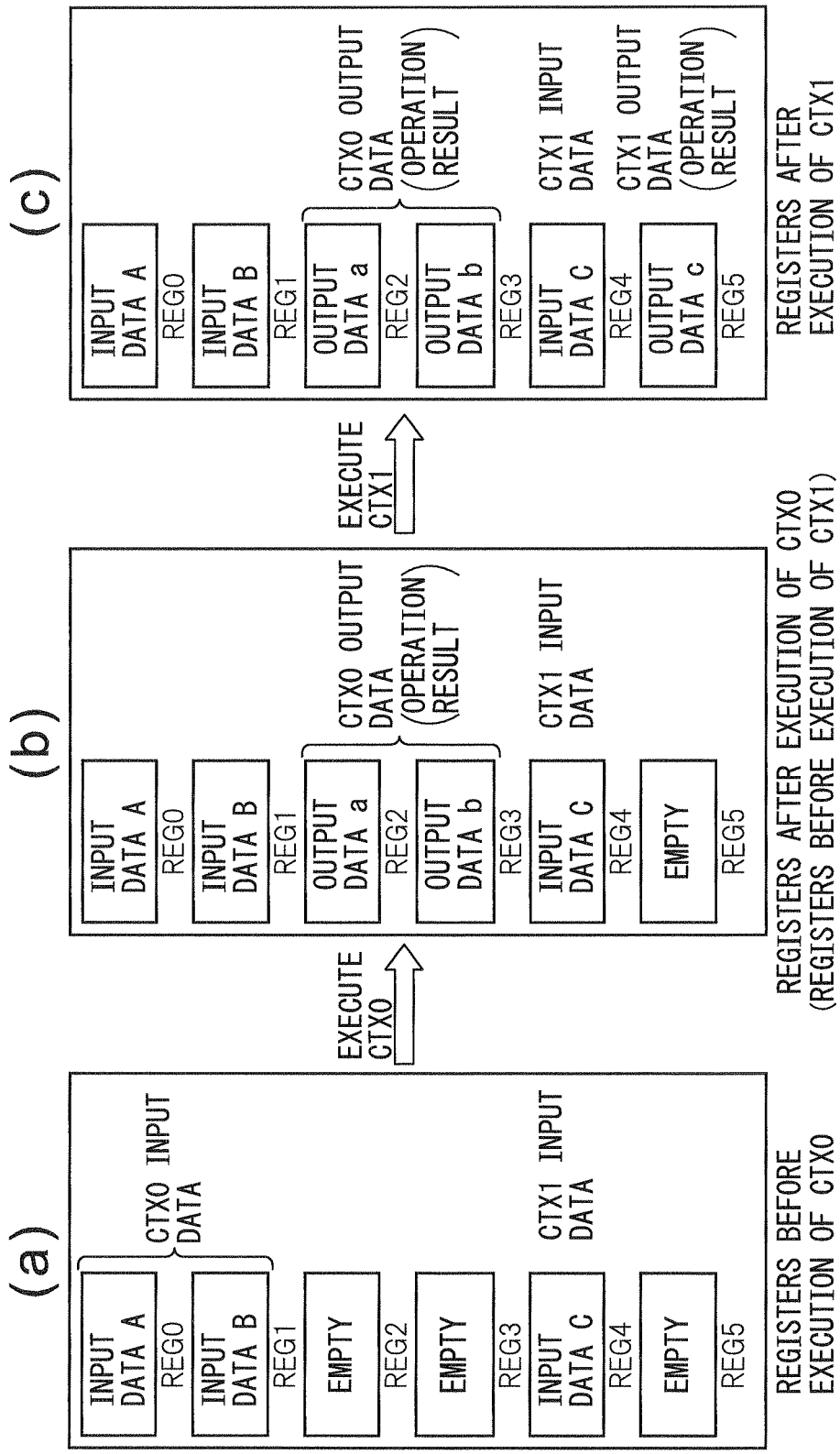

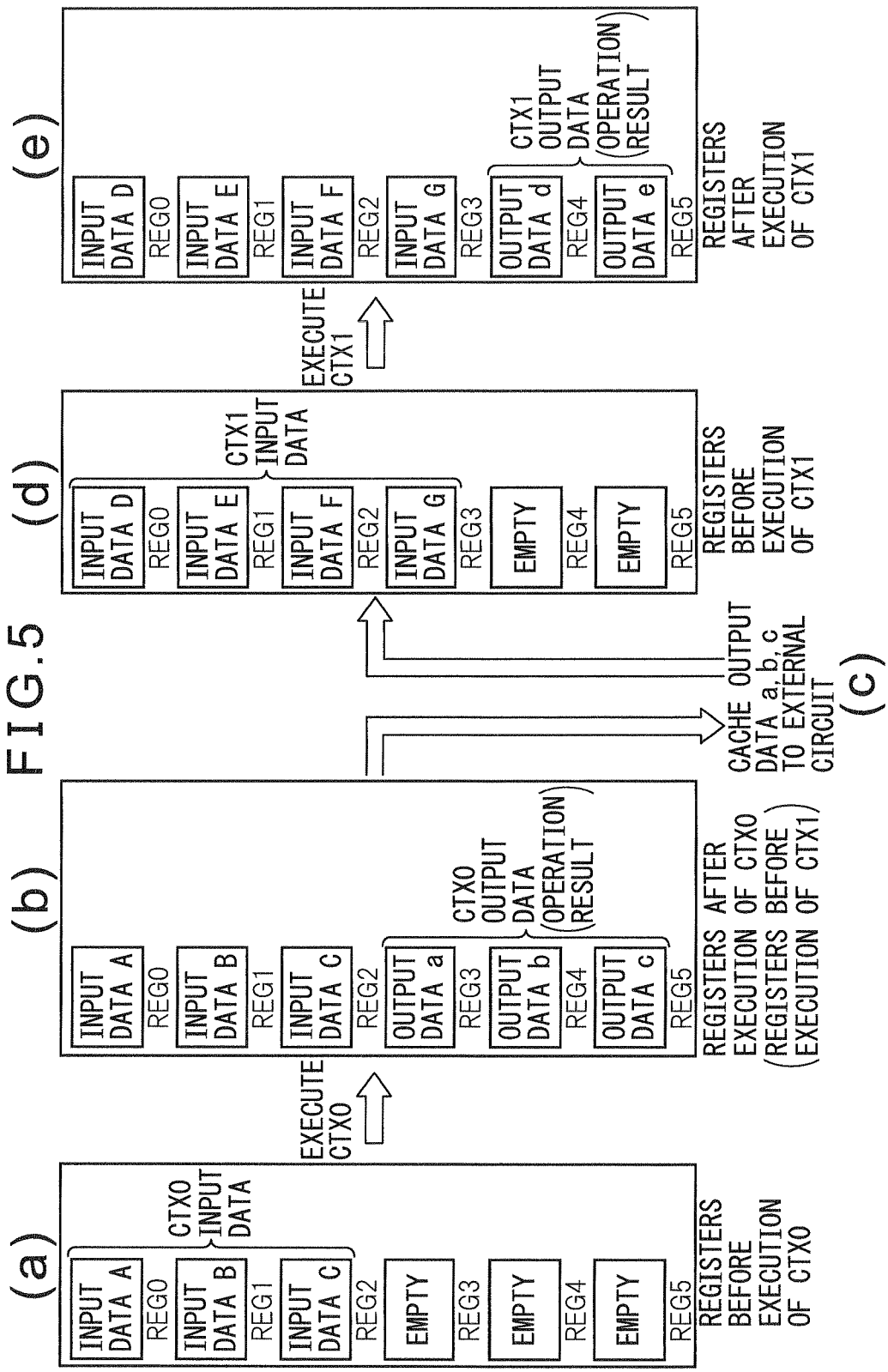

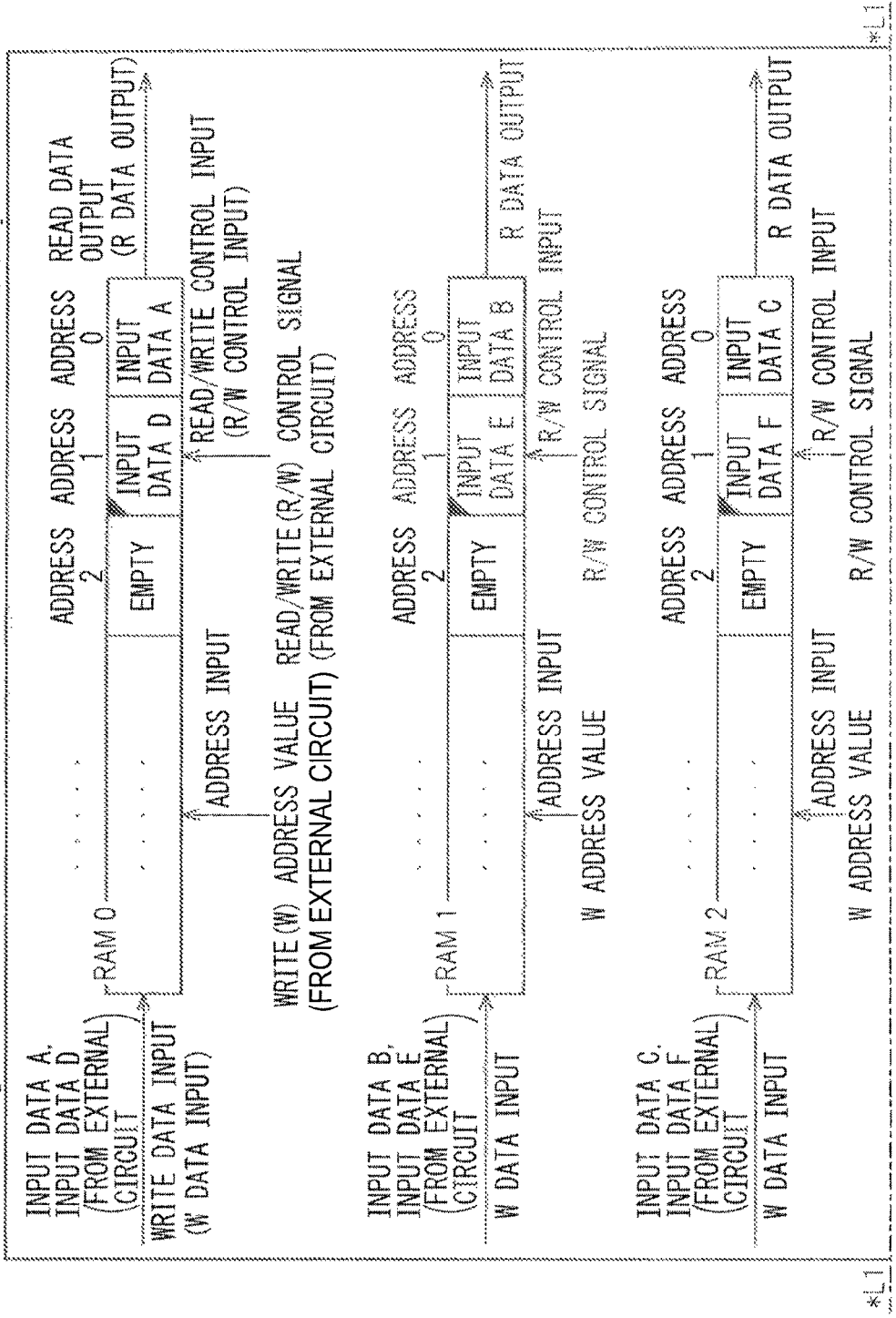

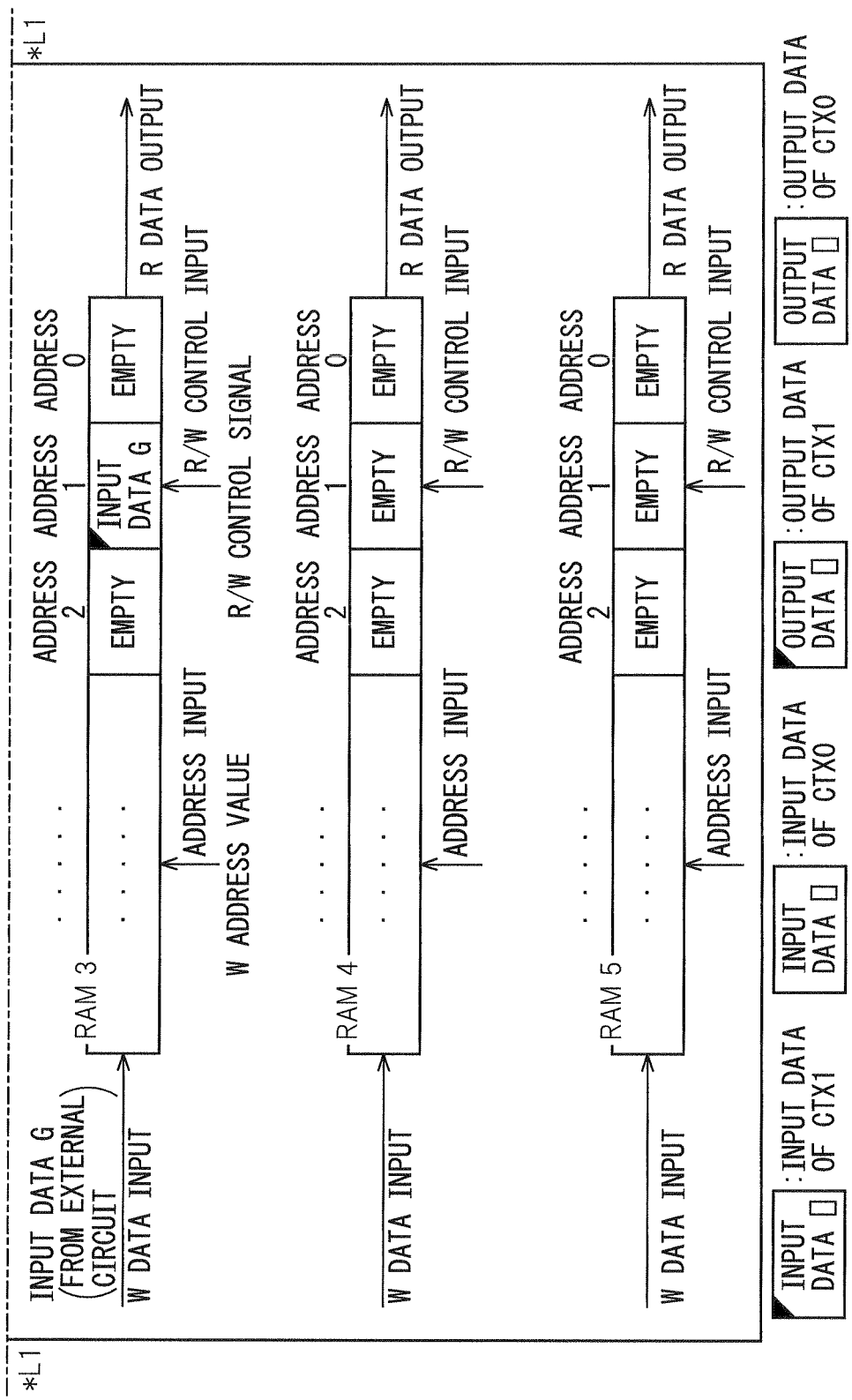

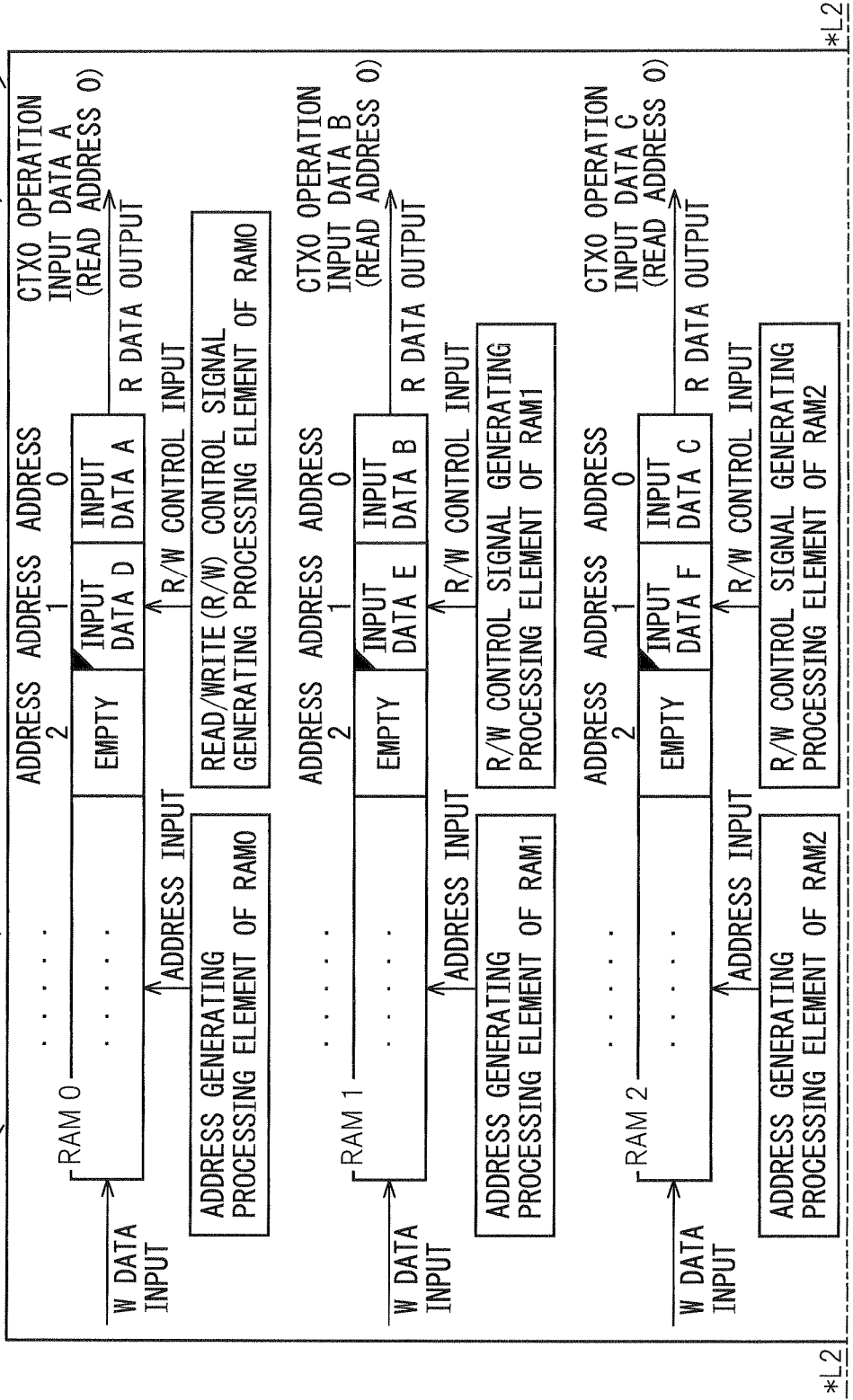

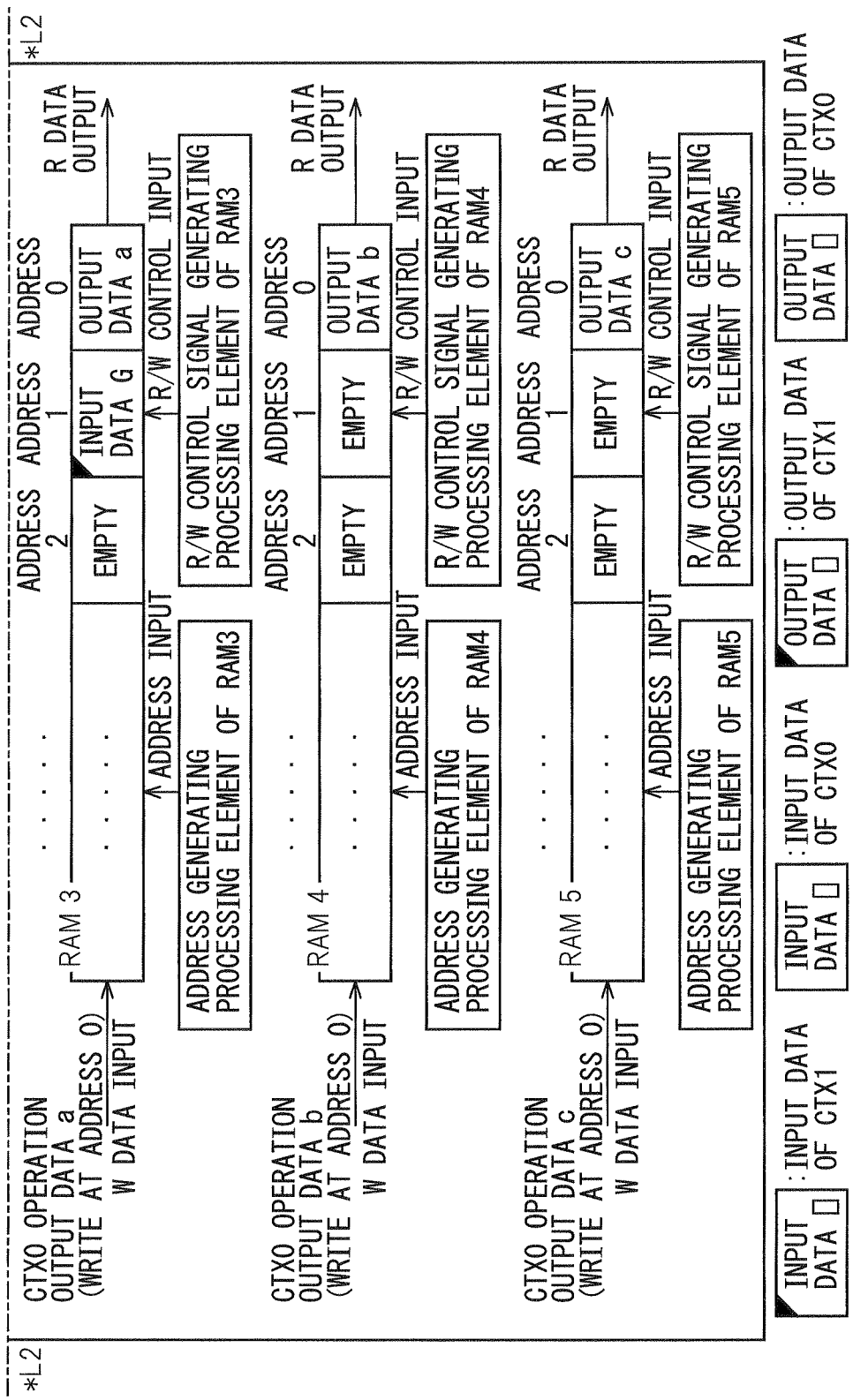

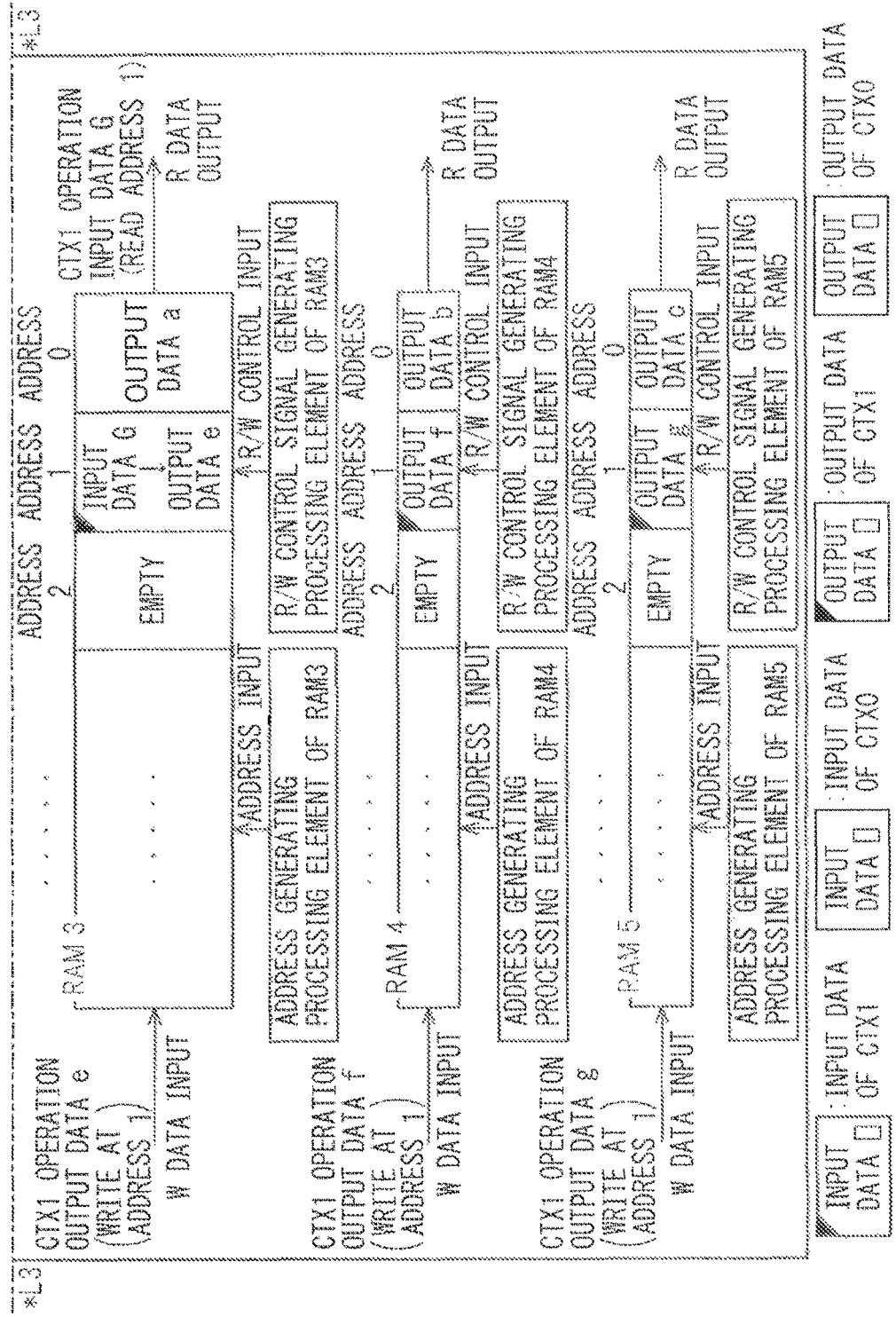

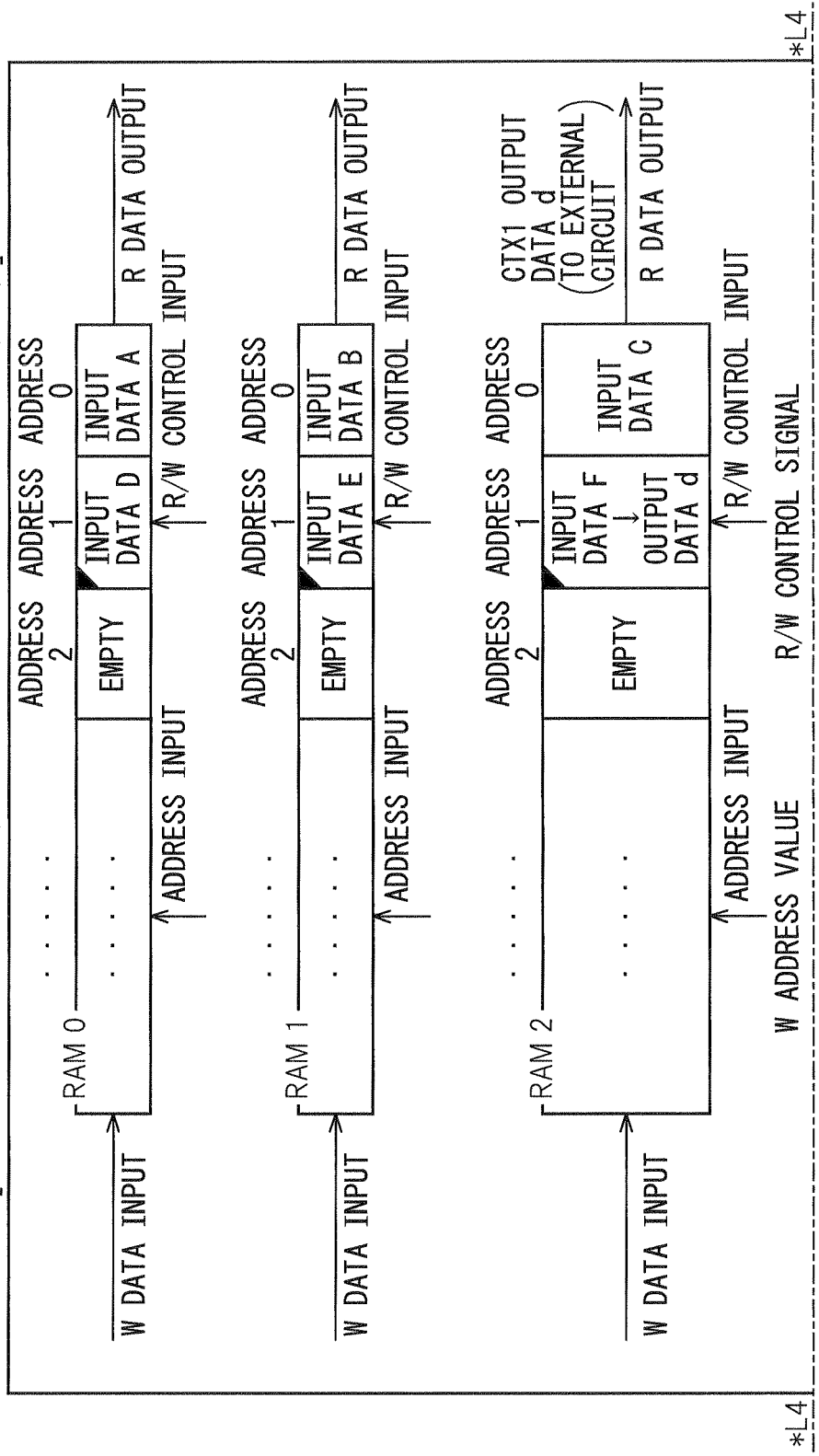

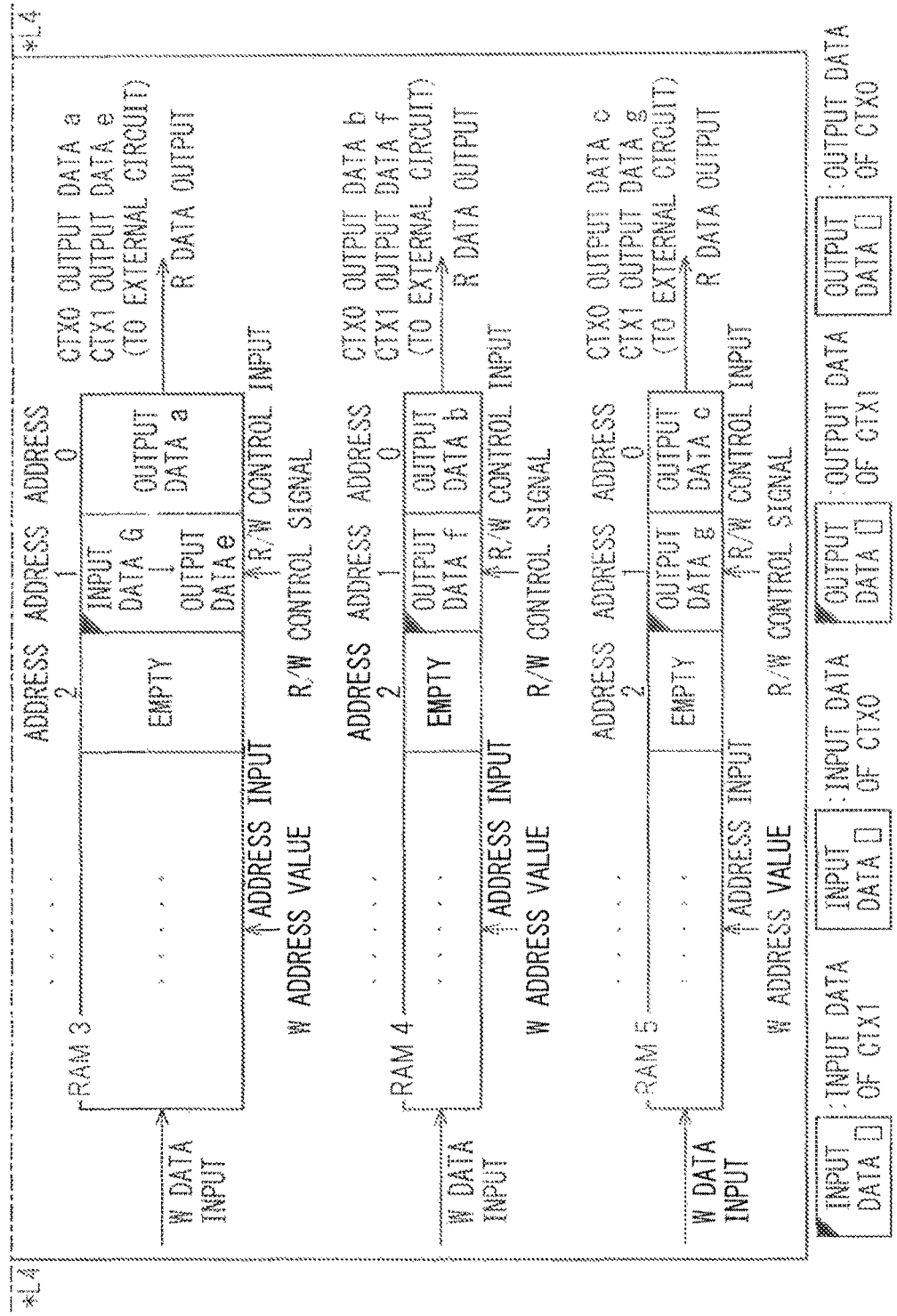

FIG.17

```
#context0
X=(A+B)*C ;

#context1
Y=(B-C)*D ;
```

RECONFIGURABLE CIRCUIT HAVING ROWS OF A MATRIX OF REGISTERS CONNECTED TO CORRESPONDING PORTS AND A SEMICONDUCTOR INTEGRATED CIRCUIT

CROSS REFERENCE TO RELATED APPLICATION

This application is based upon and claims the benefit of priority of the prior Japanese Patent Application No. 2010-015589, filed on Jan. 27, 2010, the entire contents of which are incorporated herein by reference.

FIELD

The embodiments discussed herein are related to a reconfigurable circuit and semiconductor integrated circuit.

BACKGROUND

In recent years, digital cameras, printers, information processing terminals, and other various electronic devices have been made using reconfigurable circuits enabling internal circuit configurations to be electrically programmed so as to provide various functions.

Such reconfigurable circuits include, for example, dynamic reconfigurable circuits used as accelerators for CPUs and other external circuits which change their circuit configurations dynamically along with time based on the context from the CPUs.

In this regard, in the past, a reconfigurable circuit including a plurality of reconfigurable PEs (processing elements) and controlled by configuration data including connection information of the PEs and a semiconductor integrated circuit controlled by configuration data including connection information of PEs have been proposed.

While reconfigurable circuits have been proposed in the past as explained above, in conventional reconfigurable circuits, however, the transfer time for input/output data between input/output data interface units and external circuits may not be sufficiently shortened or the size of the circuits of the data network unit may not be sufficiently reduced.

Patent Document 1: Japanese Laid-open Patent Publication No. 2009-003765
Patent Document 2: Japanese Laid-open Patent Publication No. H05-006657
Patent Document 3: Japanese Laid-open Patent Publication No. S62-151957
Patent Document 4: Japanese Laid-open Patent Publication No. S56-068979

SUMMARY

According to an aspect of the embodiments, there is provided a reconfigurable circuit including a plurality of processing elements and an input/output data interface unit. The reconfigurable circuit is configured to control connections of the plurality of processing elements for each context.

The input/output data interface unit is configured to hold operation input data which is input to the plurality of processing elements and operation output data which is output from the plurality of processing elements.

The input/output data interface unit includes a plurality of ports, and a plurality of registers. The registers are configured to be connected to the plurality of ports, and to include m (m being an integer of 2 or more) number of banks in a depth direction.

The object and advantages of the embodiments will be realized and attained by means of the elements and combinations particularly pointed out in the appended claims.

It is to be understood that both the foregoing general description and the following detailed description are exemplary and explanatory and are not restrictive of the embodiments, as claimed.

BRIEF DESCRIPTION OF DRAWINGS

FIG. 3 is a view for explaining another example of the operation of the semiconductor integrated circuit of FIG. 1;

FIG. 4 is a view for explaining the operation in the reconfigurable circuit of FIG. 1 when the number of bits of input/output data does not exceed a number of registers;

FIG. 5 is a view for explaining the operation in the reconfigurable circuit of FIG. 1 when the number of bits of input/output data exceeds a number of registers;

FIG. 6A is a view for explaining one example of the operation of a reconfigurable circuit including a memory (Part 1);

FIG. 6B is a view for explaining one example of the operation of a reconfigurable circuit including a memory (Part 2);

FIG. 7A is a view for explaining one example of the operation of a reconfigurable circuit including a memory (Part 3);

FIG. 7B is a view for explaining one example of the operation of a reconfigurable circuit including a memory (Part 4);

FIG. 8B is a view for explaining one example of the operation of a reconfigurable circuit including a memory (Part 6);

FIG. 9A is a view for explaining one example of the operation of a reconfigurable circuit including a memory (Part 7);

FIG. 9B is a view for explaining one example of the operation of a reconfigurable circuit including a memory (Part 8);

FIG. 17 is a view of an example of programming of the content of operations executed under a certain context in the reconfigurable circuit of FIG. 10.

DESCRIPTION OF EMBODIMENTS

Before proceeding to the detailed description of the embodiments, examples of the reconfigurable circuit and semiconductor integrated circuit and the issues in the same will be explained referring to FIG. 1 to FIG. 5 and FIG. 6A, FIG. 6B to FIG. 9A, and FIG. 9B.

Figure 1:
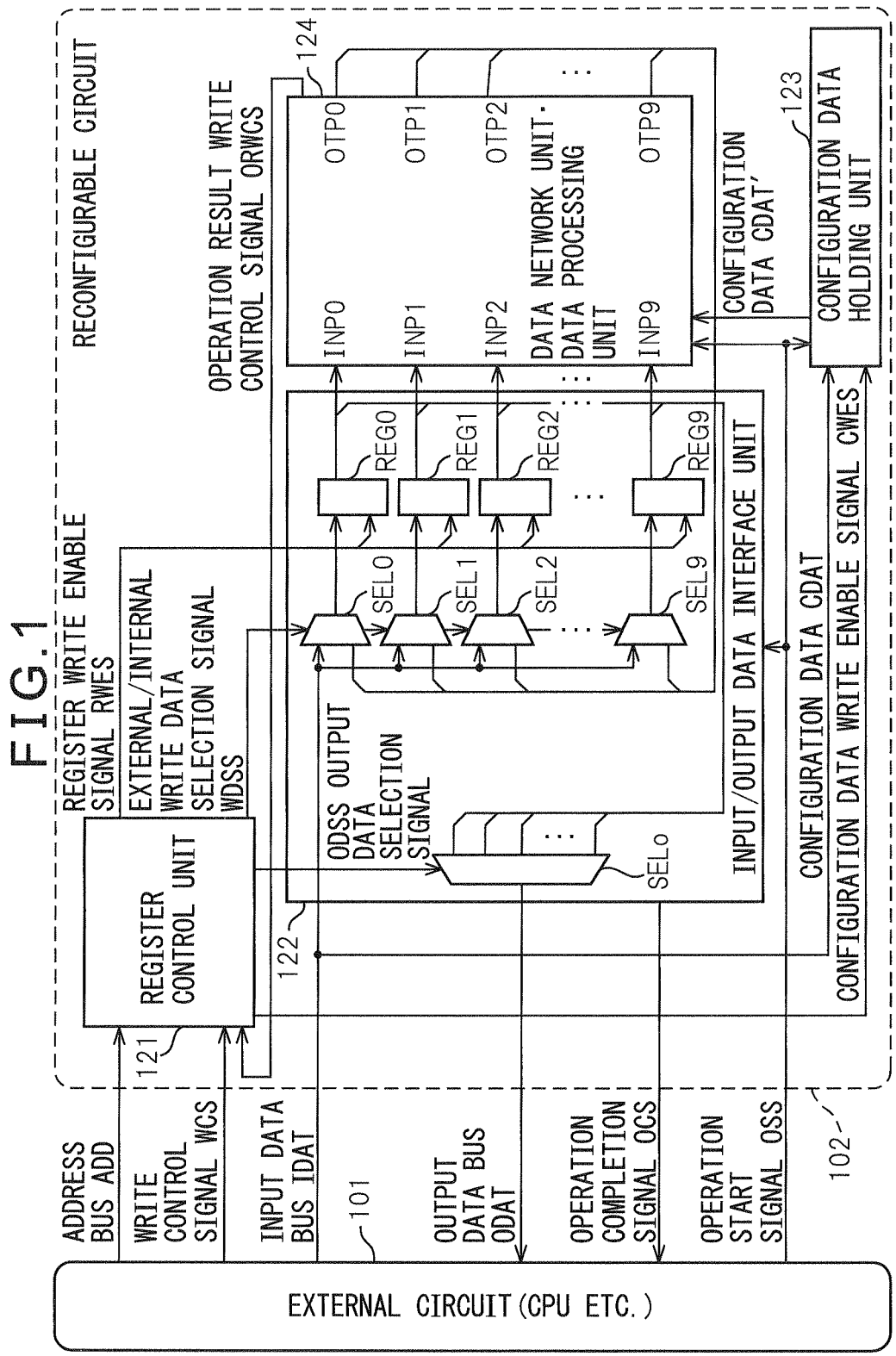
FIG. 1 is a block diagram of an example of a semiconductor integrated circuit.

FIG. 1 is a block diagram of an example of a semiconductor integrated circuit. In FIG. 1, reference numeral 101 indicates an external circuit, while 102 indicates a reconfigurable circuit. Here, the external circuit 101 is, for example, a CPU, while the reconfigurable circuit 102 is, for example, a dynamic reconfigurable circuit.

As illustrated in FIG. 1, the semiconductor integrated circuit includes the external circuit 101 and reconfigurable circuit 102. Note that, the semiconductor integrated circuit is, for example, an LSI packaged in a single module including the external circuit 101 comprising a CPU and the reconfigurable circuit 102 functioning as its accelerator.

The reconfigurable circuit 102 includes the register control unit 121, input/output data interface unit 122, configuration data holding unit 123, and data network unit/data processing unit 124.

The external circuit 101 outputs input data IDAT for operations at the reconfigurable circuit 102 to an input data bus.

Further, the external circuit 101 outputs a write control signal to the register holding unit 121 and outputs addresses ADD corresponding to registers REG0 to REG9 for storing the input data IDAT through the address bus.

Due to this, the input data IDAT is held in predetermined registers REG0 to REG9 in the input/output data interface unit 122 designated by the addresses ADD.

Furthermore, the external circuit 101 outputs configuration data CDAT for dynamic reconfiguration to the input data bus.

Further, the external circuit 101 outputs a write control signal WCS to the register holding unit 121 and outputs addresses ADD corresponding to the configuration data holding unit 123 for holding the configuration data CDAT through the address bus.

Due to this, the configuration data CDAT is held at predetermined locations in the configuration data holding unit 123 designated by the addresses ADD.

Note that, the configuration data holding unit 123 is designed to write data based on a configuration data write enable signal CWES from the register holding unit 121.

Furthermore, the external circuit 101 outputs an operation start signal OSS for starting operation to the input/output data interface unit 122, configuration data holding unit 123, and data network unit/data processing unit 124.

The input data stored in the registers REG0 to REG9 is output to the input ports INP0 to INP9 of the data network unit/data processing unit 124.

The data network unit/data processing unit 124 is illustrated as comprising a data network unit and a data processing unit including a plurality of processing elements (PE).

The data network unit selects the routes between the input ports INP0 to INP9 and the input terminals of the processing elements of the data processing unit and selects the routes from the output terminals to input terminals of the processing elements and the routes between the output terminals of the processing elements and the output ports OTP0 to OTP9 of the data network unit/data processing unit 124.

The configuration data holding unit 123 holds network route selection information of the data network, operation instruction information of the processing elements, etc. for dynamic reconfiguration.

Further, the configuration data holding unit 123 controls memories in which the configuration data is stored and outputs configuration data CDAT' corresponding to individual contexts to the data network unit/data processing unit 124.

The operation results resulting from the operations at the data processing unit are output from the output ports OTP0 to OTP9 of the data network unit/data processing unit 124 and held in the registers REG0 to REG9 corresponding to the ports OTP0 to OTP9.

Write operations on the registers REG0 to REG9 are performed based on a register write enable signal RWES generated by the register control unit 121 based on an operation result write control signal ORWCS output from the data network unit/data processing unit 124.

Selectors SEL0 to SEL9 select whether to store operation input data IDAT supplied from the external circuit 101 in the registers REG0 to REG9 or to store operation results of the results of operations by the data processing unit 124 based on an external/internal write data selection signal WDSS.

Note that, the external/internal write data selection signal WDSS is generated by the register control unit 121 based on a write control signal WCS input from the external circuit 101 and the operation write control signal ORWCS output from the data network unit/data processing unit 124.

The reconfigurable circuit 102 outputs an operation completion signal OCS to the external circuit 101 when the operations are completed, whereby the external circuit 101 recognizes that the operations have been completed.

The external circuit 101 obtains the operation results by outputting addresses ADD corresponding to the results among the registers REG0 to REG9 where the operation results are held to the address bus.

The register control unit 121 outputs an output data selection signal ODSS based on the address values from the external circuit 101. The output data (operation results) ODAT of the registers REG0 to REG9 selected by the selection circuit SELo are output through the output data bus to the external circuit 101.

In this regard, the reconfigurable circuit (for example, dynamic reconfigurable circuit) 102 may perform processing while changing the configuration for each context. Here, for example, the first context based on the dynamic reconfiguration is defined as the "context CTX0", the second context as the "context CTX1", and likewise the n-th context as the "context CTXn−1".

Figure 2:
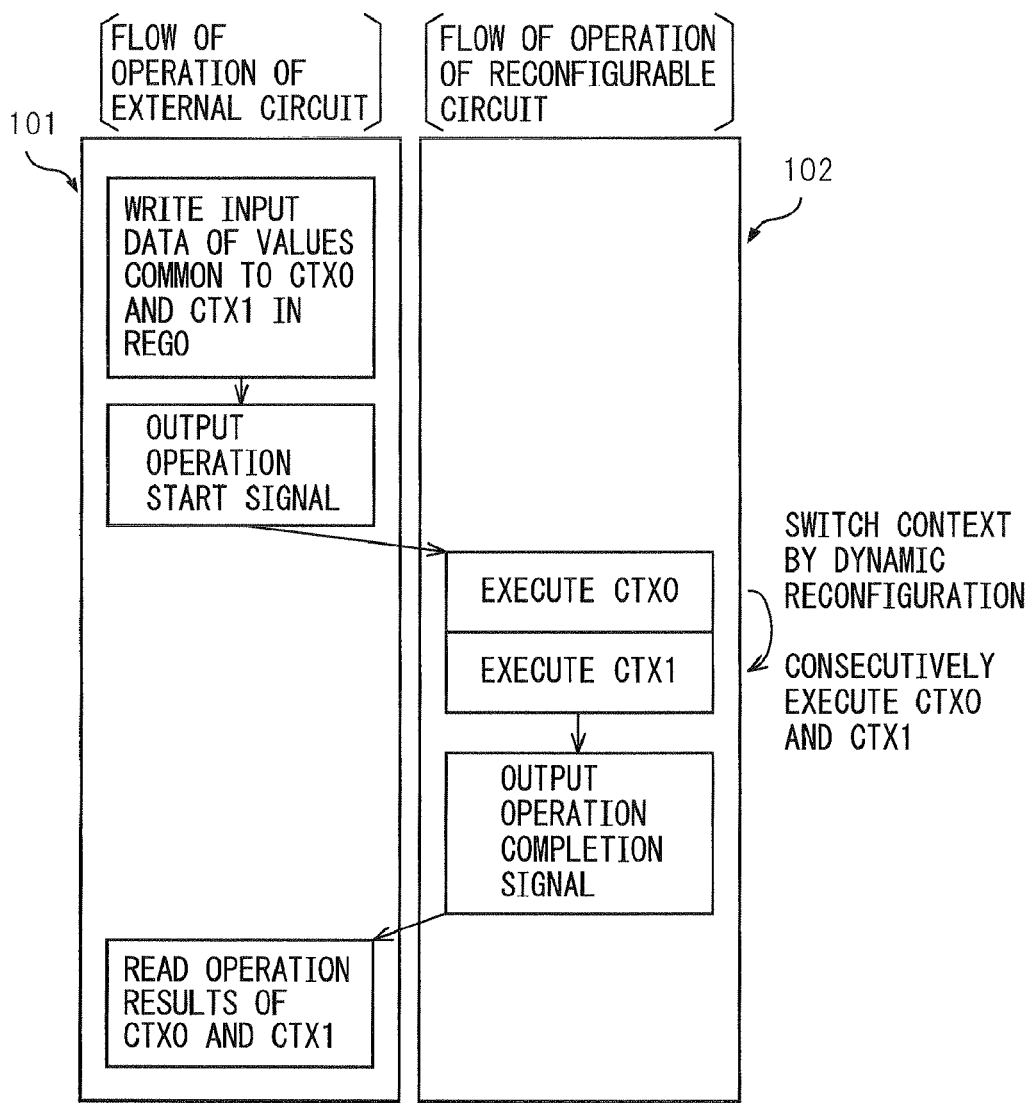
FIG. 2 is a view for explaining one example of the operation of the semiconductor integrated circuit of FIG. 1.

FIG. 2 is a view for explaining one example of the operation of the semiconductor integrated circuit of FIG. 1, while FIG. 3 is a view for explaining another example of the operation of the semiconductor integrated circuit of FIG. 1. In FIG. 2 and FIG. 3, the left side illustrates the operational flow of the external circuit 101, while the right side illustrates the operational flow of the reconfigurable circuit 102.

Here, FIG. 2 illustrates the operational flow when the input data of the input port INP0 for the context CTX0 and the input data of the input port INP0 for the context CTX1 are the same. Further, FIG. 3 illustrates the operational flow when the input data of the input port INP0 for the context CTX0 and the input data of the input port INP0 for the context CTX1 are different.

First, as illustrated in FIG. 2, when the sets of input data of the input port INP0 for the contexts CTX0 and CTX1 are the same, the external circuit 101 writes input data of common values for the context CTX0 and context CTX1 in the register REG0 and outputs an operation start signal OSS.

Receiving the operation start signal OSS, the reconfigurable circuit 102 executes processing under the context CTX0. Furthermore, when execution of processing under the context CTX0 has finished, it switches the context by dynamic reconfiguration and executes processing under the context CTX1.

The reconfigurable circuit 102 outputs the operation completion signal OCS after execution of the processing under the context CTX1 is completed. Receiving the operation completion signal OCS, the external circuit 101 recognizes that the operations have been completed and reads the operation results of the context CTX0 and the context CTX1 (output data) from the registers in which these operation results are held.

Next, as illustrated in FIG. 3, when the sets of input data of the input port INP0 for the contexts CTX0 and CTX1 are different, the external circuit 101 first writes the input data for the context CTX0 in the register REG0 and outputs the operation start signal OSS.

Receiving the operation start signal OSS, the reconfigurable circuit 102 executes processing under the context CTX0 and, when execution of processing under the context CTX0 has finished, outputs the operation completion signal OCS. At this time, the input data becomes to continue to be held until the operational processing is completed, so the input data of the context CTX1 may not be written.

Receiving the operation completion signal OCS, the external circuit 101, after receiving the operation completion signal OCS, writes the input data of the context CTX1 again in the register REG0 and outputs the operation start signal OSS for execution of processing under the context CTX1.

Receiving the operation start signal OSS, the reconfigurable circuit 102 executes the processing under the context CTX1 and, after execution of processing under the context CTX1 has finished, outputs the operation completion signal OCS.

Receiving the operation completion signal OCS, the external circuit 101 recognizes that the operations have been completed and reads out the operation results of the context CTX0 and the context CTX1 from the registers in which the operation results are held.

In this way, the input data of each context is held until the operational processing under the context is completed, so in the case of FIG. 3, overhead for writing the data occurs for each context and the processing speed ends up falling.

As explained with reference to FIG. 3, when the data of the input ports differs each time executing processing under the contexts, time is taken for the following processing.

That is, time is taken until the reconfigurable circuit 102 outputs the operation completion signal OCS from after the operations for the context CTX0 are completed and time is taken until the external circuit 101 recognizes that the execution of processing under the context CTX0 has been completed and rewrites the value of the register REG0.

Further, time is taken from when the external circuit 101 completes a write operation in the register REG0 to when it outputs an operation start signal OSS of the context CTX1. Furthermore, time is also taken until the reconfigurable circuit 102 recognizes the operation start signal OSS of the context CTX1 and starts operations under the context CTX1.

Note that, in the case of FIG. 2, compared with the case of FIG. 3, time is required for switching the context, so compared with the time taken for the processings explained above, processing is possible in a far shorter time (substantially equivalent to the time from completion of the operations to the output of the operation completion signal).

FIG. 4 is a view for explaining the operation in the reconfigurable circuit of FIG. 1 when the number of bits of input/output data does not exceed the number of registers, while FIG. 5 is a view for explaining the operation in the reconfigurable circuit of FIG. 1 when the number of bits of input/output data exceeds the number of registers.

That is, FIG. 4 explains the operation when the number of bits of input/output data (operation results) does not exceed the number of registers for holding the input/output data, while FIG. 5 explains the operation when the number of operation results exceeds the number of registers for holding the input/output data.

Note that, in the example of FIG. 4 and FIG. 5, there are six registers REG for holding the input/output data (REG0 to REG5). The operations are executed under the context CTX0 and the context CTX1.

First, as illustrated in FIG. 4(a), before executing the processing under the context CTX0, the input data A and B required for the operations under the context CTX0 are respectively held in the registers REG0 and REG1. Further, the input data C required for the operations under the context CTX1 is held in the register REG4.

Further, as illustrated in FIG. 4(b), after execution of the context CTX0, the output data "a" and "b" processed under the context CTX0 are respectively held in the registers REG2 and REG3.

Further, as illustrated in FIG. 4(c), after execution of processing under the context CTX1, the output data "c" processed under the context CTX1 is held at the register REG5.

In this way, in the example of FIG. 4, the number of bits of input/output data (six) for processing at the reconfigurable circuit 102 will never exceed the number of registers (six), so no issue arises in the example of FIG. 5 explained next.

Next, referring to FIG. 5, the case will be explained where the number of bits of input data for processing at the reconfigurable circuit 102 (seven) and the number of bits of output data processed at the reconfigurable circuit (number of operation results: five) exceed the number of registers for holding the input/output data (six).

First, as illustrated in FIG. 5(a), before execution of processing under the context CTX0, the input data A, B, and C required for operations under the context CTX0 are respectively held in the registers REG0, REG1, and REG2.

Next, as illustrated in FIG. 5(b), after execution of processing under of the context CTX0, the results of operations under the context CTX0 (output data) "a", "b", and "c" are respectively held at the registers REG3, REG4, and REG5.

In this way, all of the registers REG0 to REG5 are used for holding the input/output data of the context CTX0. That is, it is not possible to hold the input data of the context CTX1 in the registers in advance before the execution of processing under the context CTX0.

For this reason, as illustrated in FIG. 5(c), after the execution of processing under the context CTX0, the output data "a", "b", and "c" of the context CTX0 are cached in an external circuit 101 (for example, a cache memory of the CPU), then the input data of the context CTX1 is written in the registers REG0-REG3.

Furthermore, as illustrated in FIG. 5(d), the input data A, B, and C of the context CTX0 are not necessary after execution of processing under the context CTX0, so the input data D, E, and F of the context CTX1 are overwritten in the registers REG0, REG1, and REG2.

Note that, the input data G of the context CTX1 is written in the register REG3 in which the cached output data "a" of the context CTX0 had been written. Note that, the registers REG4 and REG5 in which the cached output data "b" and "c" of the context CTX0 had been held are empty in state.

Further, as illustrated in FIG. 5(e), the output data "d" and "e" of the context CTX1 are written in the now empty registers REG4 and REG5.

In this way, if the number of bits of input/output data exceeds the number of registers, that is, if the number of registers for holding the input/output data is insufficient, time is taken for caching the contents of the registers at the outside and the operation is therefore delayed.

Further, it may be considered to increase the number of registers so that the number of bits of input/output data does not exceed the number of registers, but if so, for example, the number of input ports and the number of output ports of the data network unit 124 will also increase and the size of the circuit for route selection of the data network will also end up becoming larger.

FIG. 6A, FIG. 6B to FIG. 9A, and FIG. 9B are views for explaining an example of the operation of a reconfigurable circuit including memories. Inside the data processing unit 124, RAMs (random access memories) or other memories are arranged. This is for explaining the operation in the case of utilization of memories.

That is, the memories arranged in the data processing unit 124 hold the input data for processing in the reconfigurable circuit 102 and the output data processed in the reconfigurable circuit 102.

Here, FIG. 6A and FIG. 6B, FIG. 7A and FIG. 7B, FIG. 8A and FIG. 8B, and FIG. 9A and FIG. 9B illustrate the memory states when utilizing memories (RAM0 to RAM5) arranged in the data processing unit 124 for executing the contexts CTX0 and CTX1.

That is, FIG. 6A and FIG. 6B illustrate the memory states after input data from the external circuit 101 is written, while FIG. 7A and FIG. 7B illustrate the memory states during execution and after execution of processing under the context CTX0 (before execution of processing under the context CTX1).

Figure 8A:
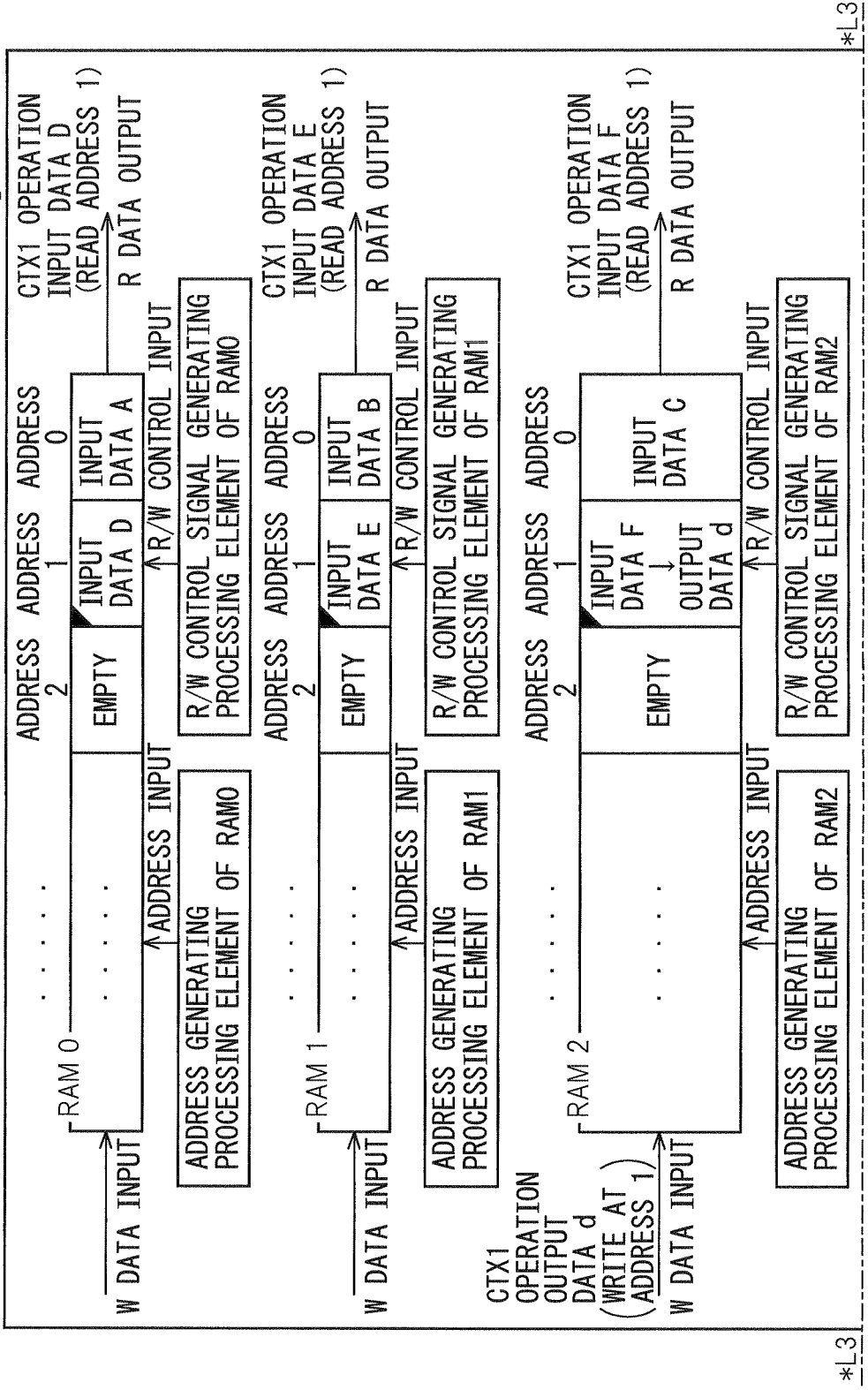
FIG. 8A is a view for explaining one example of the operation of a reconfigurable circuit including a memory (Part 5)

Furthermore, FIG. 8A and FIG. 8B illustrate the memory states during execution and after execution of processing under the context CTX1, while FIG. 9A and FIG. 9B illustrate the memory states when reading output data from an external circuit.

In the examples illustrated in FIG. 6A, FIG. 6B to FIG. 9A, and FIG. 9B, there are six memories (RAM0 to RAM5) for holding input/output data. The operations are executed under the context CTX0 and context CTX1.

First, as illustrated in FIG. 6A and FIG. 6B, before execution of processing under the context CTX0, the input data A, B, and C required for the operations under the context CTX0 are input from the external circuit 101, then the input data A, B, and C are respectively written at the addresses 0 in the memories RAM0, RAM1, and RAM2.

Similarly, the input data D, E, F, and G required for the operations under the context CTX1 are input from the external circuit 101, then the input data D, E, F, and G are respectively written at the addresses 1 of the memories RAM0, RAM1, RAM2, and RAM3.

Here, the input data A of the context CTX0 and the input data D of the context CTX1 are written in the same memory RAM0, but the write addresses differ, so data is not overwritten. The two input data may be held. Note that, the same applies for the memories RAM1 and RAM2.

Next, after the write operation of the input data A to G is completed, the external circuit 101 outputs an operation start signal OSS. Receiving this operation start signal OSS, the reconfigurable circuit 102 executes processing under the context CTX0.

That is, as illustrated in FIG. 7A and FIG. 7B, the read/write control signal generation circuit (R/W control signal generating processing element) of the memory RAM0 outputs a control signal for reading the operation input data A of the context CTX0 to the memory RAM0.

Further, the address generation circuit (address generating processing element) of the memory RAM0 outputs the address value 0 at which the input data A of the context CTX0 is held. Note that, the same is true for the memories RAM1 and RAM2 outputting the input data B and C of the context CTX0.

Furthermore, the operation output data (operation results) "a", "b", and "c" of the context CTX0 are respectively written at the addresses 0 of the memories RAM3, RAM4, and RAM5.

At this time, the input data G of the context CTX1 is held at the memory RAM3, but the operation output data A of the context CTX0 is held at the address 1 different from the address 0 written at, so data is not overwritten.

Here, the R/W control signal generating processing element of the memory RAM3, synchronized with the timing of input of the operation output data "a" of the context CTX0 to the memory RAM3, outputs a control signal for writing the operation output data "a" in the memory RAM3.

Further, the address generating processing element of the memory RAM3 outputs the address value 0 for writing the operation output data "a" at the address 0. Note that, the same applies for the memories RAM4 and RAM5 writing the operation output data "b" and "c" of the context CTX0.

Furthermore, as illustrated in FIG. 8A and FIG. 8B, after the execution of processing under the context CTX0 is completed, the context is switched by dynamic reconfiguration and processing under the context CTX1 is executed.

That is, the R/W control signal generating processing element of the memory RAM0 outputs a control signal for reading out the operation input data D of the context CTX1 to the memory RAM0.

Further, the address generating processing element of the memory RAM0 outputs the address value 1 at which the input data D of the context CTX1 is held. The same applies for the memories RAM1, RAM2, and RAM3 outputting the input data E, F, and G of the context CTX1.

The operation output data (operation results) "d", "e", "f", and "g" of the context CTX1 are respectively written at the addresses 1 of the memories RAM2, RAM3, RAM4, and RAM5.

At this time, the input data F and G of the context CTX1 which had been held at the memories RAM2 and RAM3 are overwritten, but the operations under the context CTX1 are completed, so the input data of the context CTX1 is unnecessary and no problem arises even if it is overwritten.

The R/W control signal generating processing element of the memory RAM2, synchronized with the timing of input of the operation output data "d" of the context CTX1 to the memory RAM2, outputs a control signal for writing the operation output data "d" in the memory RAM2.

Further, the address generating processing element of the memory RAM2 outputs the address value 1 for writing the operation output data "d" to the address 1. The same applies for the memories RAM3, RAM4, and RAM5 writing the output data "e", "f", and "g" of the context CTX1.

Further, the reconfigurable circuit 102 outputs the operation completion signal OCS to the external circuit 101 after the execution of processing under the context CTX1 is completed.

Furthermore, receiving the operation completion signal OCS, the external circuit 101 recognizes that the operations have been completed and reads the operation results (operation output data) of the context CTX0 and the context CTX1 from the corresponding addresses of the memories RAM0 to RAM5 at which those operation results are held.

As illustrated in FIG. 9A and FIG. 9B, the operation results "a", "b", and "c" of the context CTX0 held at the addresses 0 of the memories RAM3, RAM4, and RAM5 and the operation results "d", "e", "f", and "g" of the context CTX1 held at the addresses 1 of the memories RAM2, RAM3, RAM4, and RAM5 are read out.

In this way, the operation results "a", "b", and "c" of the context CTX0 are held without being overwritten by execution of the context CTX1. For this reason, it is not necessary to cache the results of the context CTX0 in the external circuit 101.

However, the reconfigurable circuits including the RAMs and other memories explained with reference to FIG. 6A, FIG. 6B to FIG. 9A, FIG. 9B include the following issues.

First, processing elements for generating the address values for reading addresses at which input data is stored in context units become necessary for the memories (RAMs) in which the operation input data is stored. Furthermore, processing elements for generating the address values for writing output data in context units become necessary for the memories storing the data.

That is, a large number of address generating processing elements becomes necessary, so the number of processing elements for use for the inherent processing is liable to become insufficient.

Further, R/W control signal generating processing elements for context units become necessary for the memories in which the operation input data is stored and the memories storing the operation output data, so the number of processing elements for use for the inherent processing is liable to become insufficient.

Furthermore, the memory resources in the data processing unit are consumed for data input/output, so the memory area for data operations is liable to become insufficient.

Further, the network resources between the memories and the address generating processing elements and between the memories and the R/W control signal generating processing elements are consumed, so when using a data network which is not completely integrated, the connectability between other processing elements and processing elements falls.

Further, for example, when newly adding RAMs, address generating processing elements, and R/W control signal generating processing elements, the number of input/output ports for connecting the inputs/outputs of the RAMs and processing elements to the data network is liable to increase and the circuit scale of the data network is liable to grow.

Below, embodiments of the reconfigurable circuit and semiconductor integrated circuit will be explained in detail with reference to the accompanying drawings.

Figure 10:
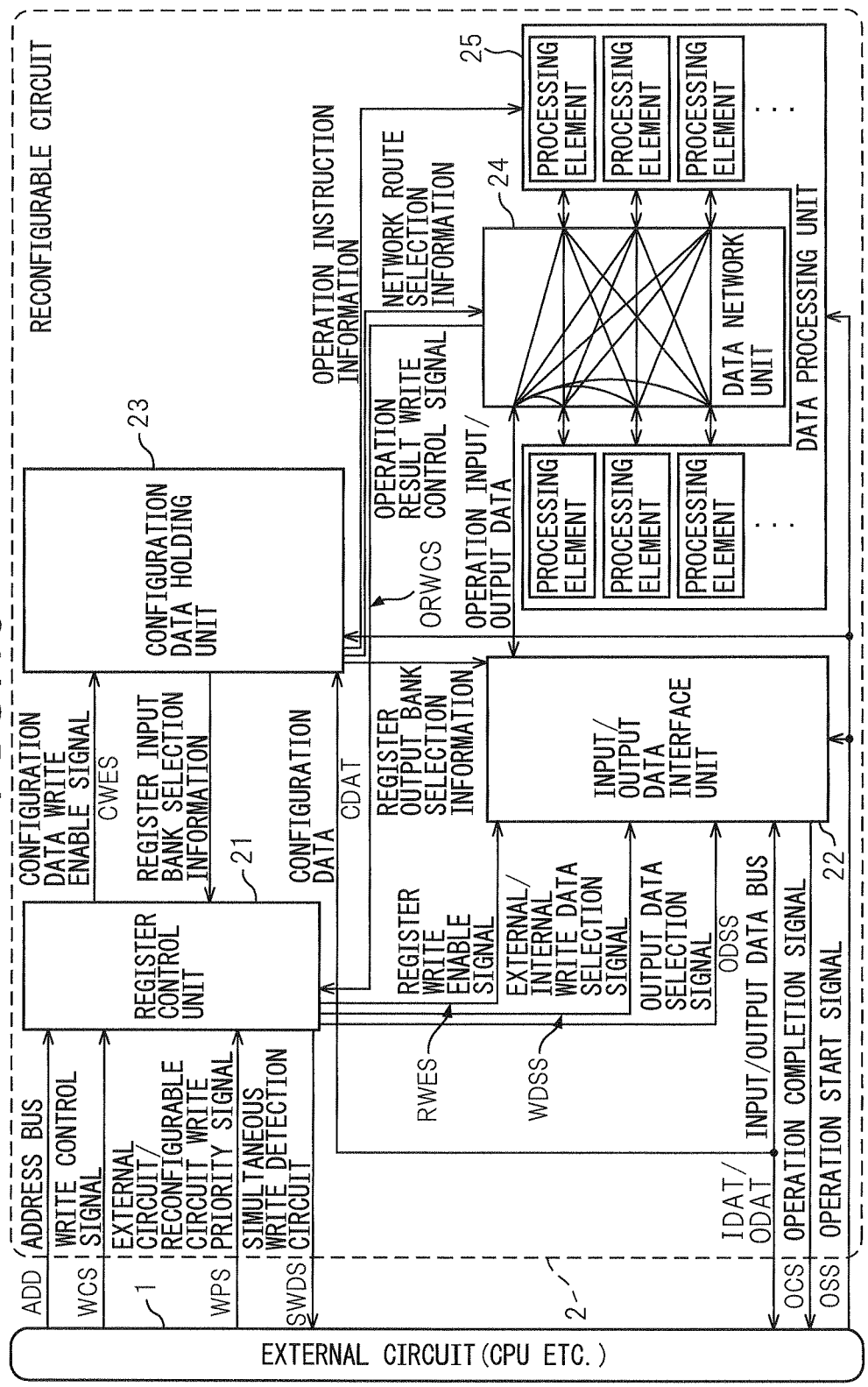
FIG. 10 is a block diagram of one embodiment of a semiconductor integrated circuit.

FIG. 10 is a block diagram illustrating an embodiment of a semiconductor integrated circuit. In FIG. 10, reference numeral 1 indicates an external circuit, while 2 indicates a reconfigurable circuit including a dynamic reconfigurable circuit.

As illustrated in FIG. 10, the semiconductor integrated circuit includes the external circuit 1 and reconfigurable circuit 2. Here, the semiconductor integrated circuit is, for example, an LSI packaged in a single module including a CPU comprising the external circuit 1 and the reconfigurable circuit 2 functioning as its accelerator.

The reconfigurable circuit 2 includes a register control unit 21, input/output data interface unit 22, configuration data holding unit 23, data network unit 24, and data processing unit 25.

The external circuit 1 outputs input data IDAT for processing at the reconfigurable circuit 2 to the input/output data bus.

Further, the external circuit 1 outputs a write control signal WCS to the register holding unit 21 and outputs addresses ADD corresponding to registers REG00 to REGmn for storing the input data IDAT through the address bus.

Here, the registers REG00 to REGmn form a matrix structure in the input/output data interface unit 22 with, for example, REG00 to REG0$n$ corresponding to the output ports OTP0 to OTPn (ports PRT0 to PRTn) arranged in the depth direction in m number (m banks) ( . . . , REGm0 to REGmn).

Note that, the registers REG00 to REGmn may be flip-flops (FF) and RAMs and other devices able to store data.

The register control unit 21 outputs, to the input/output data interface unit 22, a register write enable signal RWES for the registers REG00 to REGmn of the ports and banks corresponding to the input address values.

Furthermore, the register control unit 21 outputs, to the input/output data interface unit 22, an external/internal write data selection signal WDSS to select external data. These operations enable the input data IDAT from the external circuit 1 to be held in the registers indicated by the addresses ADD.

The external circuit 1 outputs, to the configuration data holding unit 23, configuration data for dynamic reconfiguration through the input/output data bus.

Further, the external circuit 1 outputs, to the register control unit 21, the write control signal WCS and addresses ADD corresponding to the configuration data holding unit 23 holding the configuration data through the address bus.

Furthermore, the external circuit 1 outputs, to the register control unit 21, an external circuit/reconfigurable circuit write priority signal WPS indicating which of the data from the external circuit 1 or reconfigurable circuit 2 to write with priority.

The register control unit 21 outputs, to the configuration data holding unit 23, a configuration data write enable signal OWES and holds the configuration data from the external circuit 1.

The external circuit 1 outputs, to the input/output data interface unit 22, configuration data holding unit 23, and data processing unit 25, an operation start signal OSS for starting the operations.

The operation input data stored by the operation start signal OSS in the registers (REG00 to REGmn) of the input/output data interface unit 22 is output through the data network unit 24 to the data processing unit 25 (processing elements of data processing unit).

The configuration data holding unit 23 outputs, for each port, information, in context units, of which bank of registers to output to in the data network unit 24.

The data network unit 24 selects the routes between the output ports of the input/output data interface unit 22 and the input terminals of the processing elements of the data processing unit 25 and selects the routes between the output terminals of the processing elements and the input ports of the input/output data interface unit 22. Furthermore, the data network unit 24 selects the routes from the output terminals of the processing elements to the input terminals of the processing elements.

At the configuration data holding unit 23, network route selection information and operation instruction information for the processing elements for dynamic reconfiguration, bank information of the registers (REG00 to REGmn) in the input/output data interface unit 22, etc. are held.

Further, the configuration data holding unit 23 controls the memories in which the configuration data of the different contexts are stored and outputs the configuration data corresponding to the different contexts.

The results of the operations at the data processing unit 25 are output through the data network unit 24 and held at the registers (REG00 to REGmn) corresponding to the ports of the input/output data interface unit 22.

Here, write operations are performed on the registers (REG00 to REGmn) based on the operation result write control signal ORWCS output from the data network unit 24 and the register input bank selection information of the ports output from the configuration data holding unit 23.

That is, the register control unit 21 receives the operation result write control signal ORWCS and the register input bank selection information of the ports, generates a corresponding register write enable signal RWES, and controls the write operations at the registers.

Furthermore, the register control unit 21 outputs, to the input/output data interface unit 22, an external/internal write data selection signal WDSS to select the internal data. Due to these operations, it is possible to hold the results of operations at the data processing unit 25 output through the data network unit 24 at the registers indicated by the addresses ADD.

Here, the write processing on the registers (REG00 to REGmn) is performed based on information of which write operation to give priority to when a situation arises where a write operation from the external circuit 1 and a write operation from the reconfigurable circuit 2 are performed simultaneously.

That is, the priority write processing when a write operation from the external circuit 1 and a write operation from the reconfigurable circuit 2 occur simultaneously is performed based on the external circuit/reconfigurable circuit write priority signal WPS supplied from the external circuit 1 to the register control unit 21.

Note that, normally, situations where there are simultaneous write operations do not occur, so for example a simultaneous write detection signal SWDS from the register control unit 21 to the external circuit 1 is output as error information to the external circuit 1.

When the operations are completed, an operation completion signal OCS is output from the input/output data interface unit 22 to the external circuit 1, and the external circuit 1 confirms that the operations have been completed.

Further, the external circuit 1 obtains the operation results by outputting the addresses ADD corresponding to the registers (REG00 to REGmn) at which the operation results are held through the address bus to the register control unit 21.

The register control unit 21 outputs, to the input/output data interface unit 22, the output data selection signal ODSS based on the address values, whereby the output data (operation results) ODAT of the corresponding registers is output through the input/output data bus to the external circuit 1.

Figure 11:
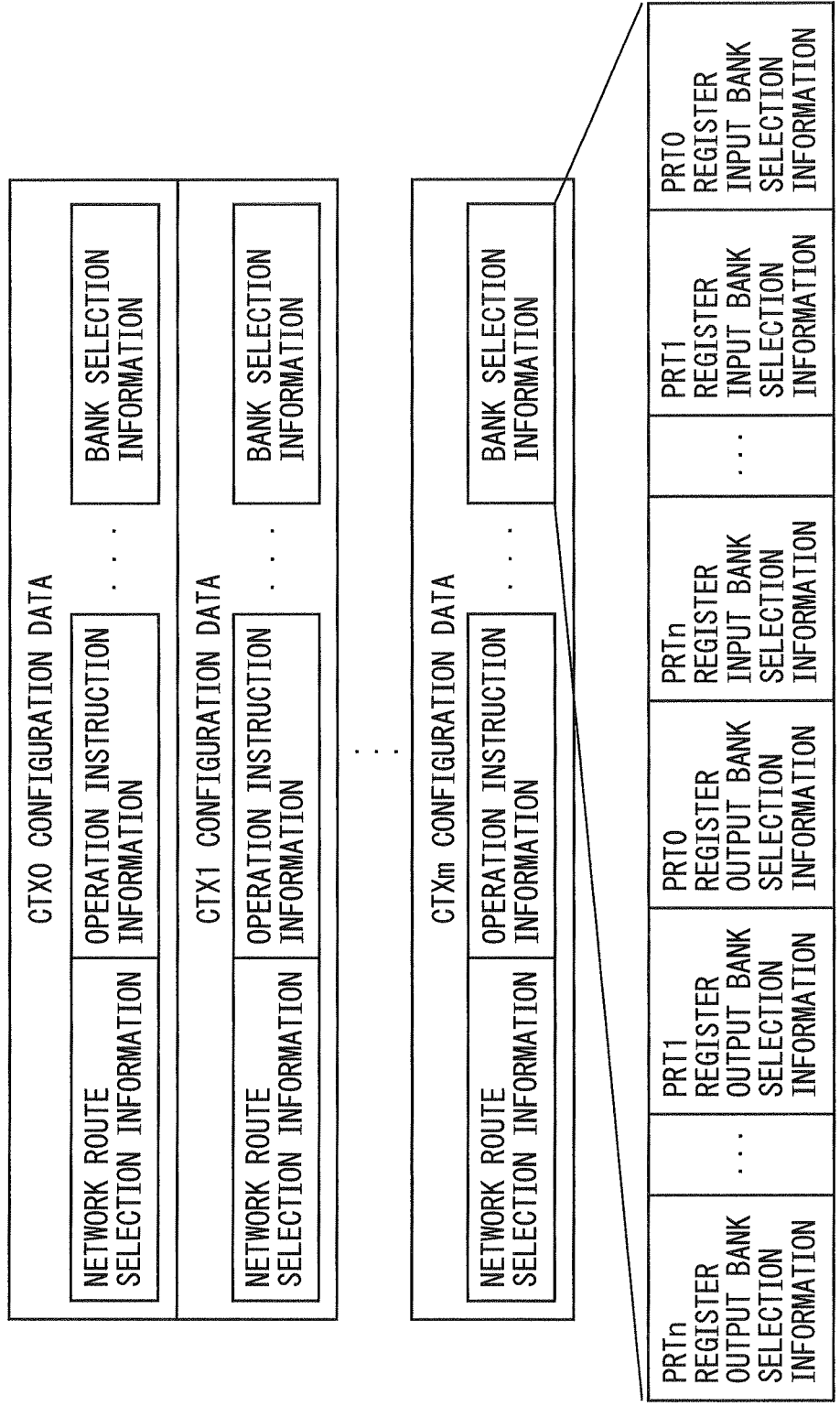
FIG. 11 is a block diagram of one example of a configuration data holding unit in the reconfigurable circuit of FIG. 10.

FIG. 11 is a block diagram illustrating one example of the configuration data holding unit in the reconfigurable circuit of FIG. 10.

The configuration data holding unit 23 includes a plurality of configuration data for switching the banks (BK0 to BKn) of the registers (REG00 to REGmn) in the input/output data interface unit 22 and may switch banks in context units.

That is, as illustrated in FIG. 11, the configuration data holding unit 23, for example, holds the configuration data of n number of contexts CTX0 to CTXn.

The configuration data respectively include network route selection information, operation instruction information, register output bank selection information and register input bank selection information of the ports, and other data.

That is, the configuration data includes, for example, the register input bank selection information of the port PRT0 to register input bank selection information of the port PRTn and register output bank selection information of the port PRT0 to register output bank selection information of the port PRTn.

Using the register bank selection information of the ports, it is possible to designate to which bank (BK0 to BKn) of registers (REG00 to REGmn) to input data in units of the ports PRT0 to PRTn of the contexts CTX0 to CTXn and from which bank of registers to output from.

Figure 12:
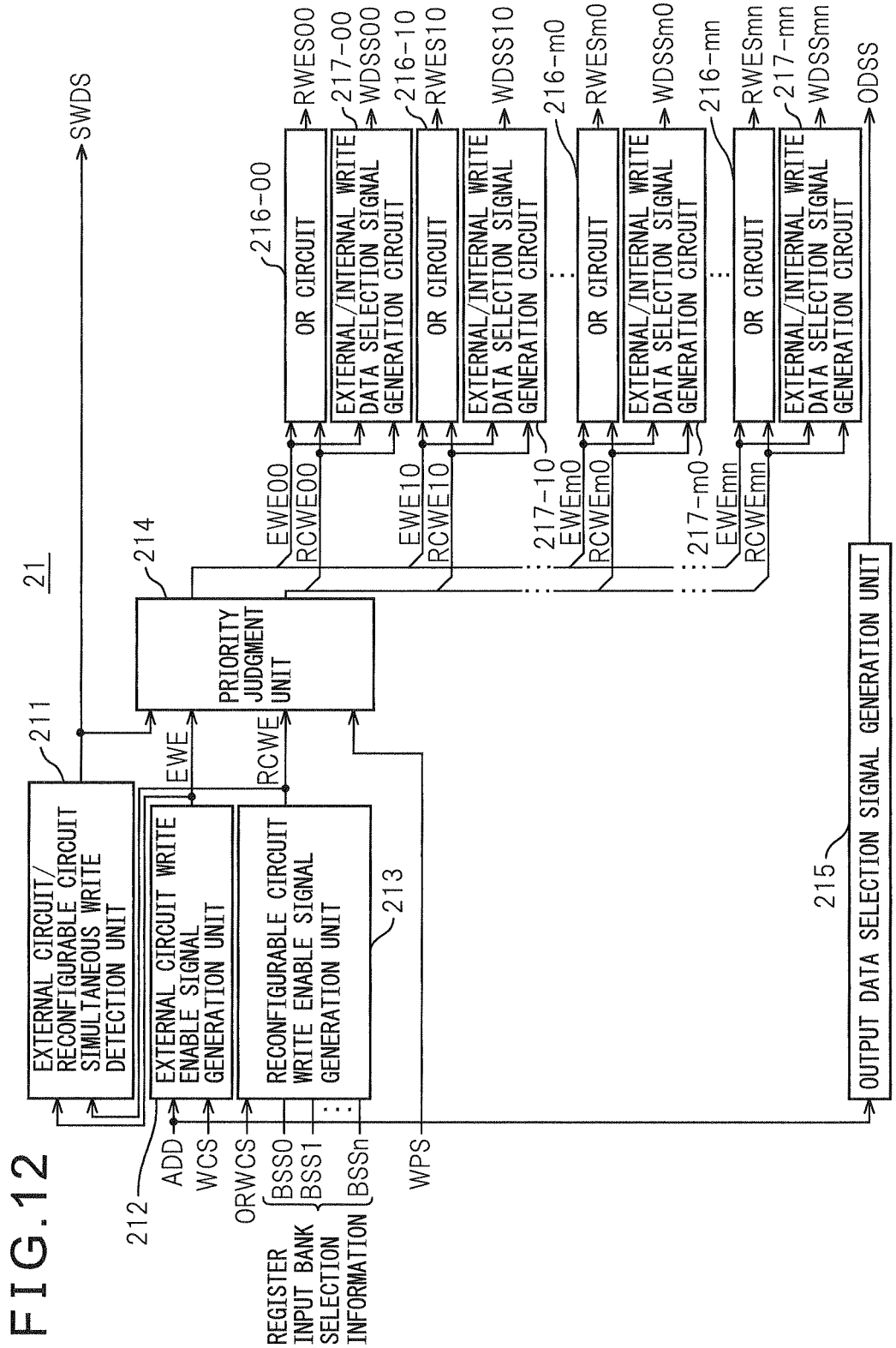
FIG. 12 is a block diagram of one example of a register control unit in the reconfigurable circuit of FIG. 10.

FIG. 12 is a block diagram illustrating an example of the register control unit in the reconfigurable circuit of FIG. 10.

As illustrated in FIG. 12, the register control unit 21 includes an external circuit/reconfigurable circuit simultaneous write detection unit 211, external circuit write enable signal generation unit 212, and reconfigurable circuit write enable signal generation unit 213.

Furthermore, the register control unit 21 includes a priority judgment unit 214, output data selection signal generation unit 215, OR circuits 216-00 to 216-*mn*, and external/internal write data selection signal generation circuits 217-00 to 217-*mn*.

The external circuit write enable signal generation unit 212 receives the addresses ADD and write control signal WCS from the external circuit 1 and outputs the external circuit write enable signal EWE to the external circuit/ reconfigurable circuit simultaneous write detection unit 211 and priority judgment unit 214.

The reconfigurable circuit write enable signal generation unit 213 receives the operation result write control signal ORWCS from the data network unit 24 and the register input bank selection information of the ports from the configuration data holding unit 23.

Here, the register input bank selection information of the ports correspond to the register bank selection signals BSS0 to BSSn of the (input/output) ports PRT0 to PRTn. Further, the generated reconfigurable circuit write enable signal RCWE is output to the external circuit/reconfigurable circuit simultaneous write detection unit 211 and priority judgment unit 214.

The external circuit/reconfigurable circuit simultaneous write detection unit 211 receives the external circuit write enable signal EWE and reconfigurable circuit write enable signal RCWE, generates the simultaneous write detection signal SWDS, and outputs it to the external circuit 1 and priority judgment unit 214.

Note that, as explained above, the simultaneous write detection signals SWDS is output when write operations of the external circuit 1 and the reconfigurable circuit 2 simultaneously occur—something which does not usually happen—and is provided as error information to the external circuit 1.

The priority judgment unit 214 receives the external circuit write enable signal EWE and reconfigurable circuit write enable signal RCWE and performs the processing for judgment of priority based on the simultaneous write detection signal SWDS and the external circuit/reconfigurable circuit write priority signal WPS.

That is, when a write operation from the external circuit 1 and a write operation from the reconfigurable circuit 2 simultaneously occur, an enable signal EWE (EWE00 to EWEmn) or RCWE (RCWE00 to RCWEmn) of the side given priority based on the priority signal WPS is selected and output to the succeeding stage circuit.

Further, the priority judgment unit 214 outputs the write enable signals EWE00 to EWEmn from the external circuit 1 to the banks of registers and the write enable signals RCWE00 to RCWEmn from the reconfigurable circuit 2 to the banks of registers.

That is, the signals EWE00 and RCWE00 for the register REG00 of the port PRT0 of the bank BK0 are supplied to the OR circuit 216-00 and the external/internal write data selection signal generation circuit 217-00 whereby the signals RWES00 and WDSS00 are output.

Further, the signals EWE10 and RCWE10 for the register REG10 of the port PRT0 of the bank BK1 are supplied to the OR circuit 216-10 and the external/internal write data selection signal generation circuit 217-10 whereby the signals RWES10 and WDSS10 are output.

Furthermore, the signals EWEm0 and RCWEm0 for the register REGm0 of the port PRT0 of the bank BKm are supplied to the OR circuit 216-m0 and the external/internal write data selection signal generation circuit 217-m0 whereby the signals RWESm0 and WDSSm0 are output.

Further, the signals EWEmn and RCWEmn for the register REGmn of the port PRTn of the bank BKm are supplied to the OR circuit 216-*mn* and the external/internal write data selection signal generation circuit 217-*mn* whereby the signals RWESmn and WDSSmn are output.

Note that, the output data selection signal generation circuit 215 generates an output data selection signal for selection of the register output corresponding to an address value from the address information ADD illustrating the register coverage from the external circuit 1 and outputs it to the later mentioned selector SELo of FIG. 13.

Figure 13:
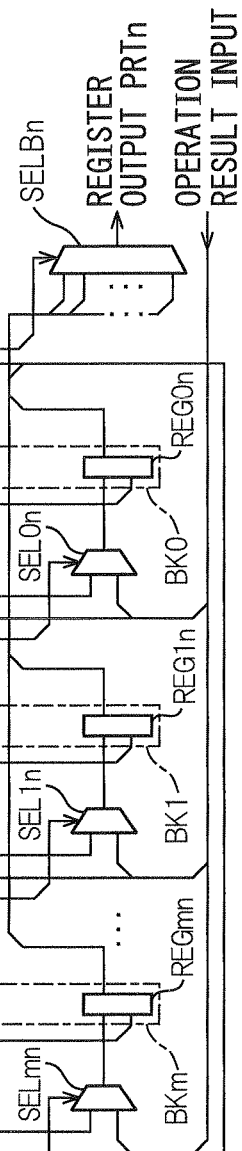
FIG. 13 is a block diagram of one example of an input/output data interface unit in the reconfigurable circuit of FIG. 10.

FIG. 13 is a block diagram illustrating an example of the input/output data interface unit in the reconfigurable circuit of FIG. 10.

As illustrated in FIG. 13, the input/output data interface unit 22 includes a plurality of registers REG00 to REGmn and selectors SELo, SEL00 to SELmn, and SELB0 to SELBn.

As illustrated in FIG. 12 and FIG. 13, the register write enable signals RWES00 to RWESmn (RWES) are supplied for the corresponding registers REG00 to REGmn as write enable signals.

That is, when the register write enable signals RWES00 to RWESmn are asserted, the supplied data is written in the corresponding registers REG00 to REGmn.

Furthermore, as illustrated in FIG. 12 and FIG. 13, the generated external/internal write data selection signals WDSS00 to WDSSmn (WDSS) are supplied to the corresponding selectors SEL00 to SELmn as write data selection signals.

That is, the selectors SEL00 to SELmn select the input data IDAT from the external circuit 1 or the operation result inputs from the data network 24 (processing unit 25) in accordance with the signals WDSS00 to WDSSmn and supply the same to the corresponding registers REG00 to REGmn.

In FIG. 13, the registers REG00 to REGmn include the functions of holding the input data (IDATA) for operations at the reconfigurable circuit 1 and the results of the operations (operation result input).

Here, the registers REG00 to REGmn may hold a plurality of number of data for the ports PRT0 to PRTn. Note that, the ports PRT0 to PRTn function as the input ports and output ports (input/output ports) of the input/output data interface unit 22.

For example, when focusing on the port PRT0, it is possible to hold m+1 number of data such as the registers REG00, REG10, REG20, . . . , REGm0. That is, there are the storage regions (banks) BK0 to BKm in the depth direction for the ports.

As explained above, data is written in the registers REG00 to REGmn by the register write enable signals RWES00 to RWESmn, but the input data IDAT from the external circuit 1 and the operation result input of the reconfigurable circuit 2 itself is selected and held.

The selectors SELB0 to SELBn select which banks BK0 to BLM of held data to output as input data for operations at the data processing unit 25 based on the register output bank selection information of the different ports at the different ports PRT0 to PRTn.

Note that, the register output bank selection information (configuration data) of the different ports are supplied from the configuration data holding unit 23. Further, the banks may be switched in units of context (CTX0, CTX1) as explained later.

Further, the selector SELo selects which registers REG00 to REGmn of held operation results to output to the external circuit 1. Here, the registers REG00 to REGmn are selected by the output data selection signal ODSS from the register control unit 21. Note that, the external circuit 1 may select all of the registers REG00 to REGmn.

Furthermore, the selectors SEL00 to SELmn select whether to write input data IDAT from the external circuit 1 to the registers REG00 to REGmn or to write the results of operations at the reconfigurable circuit 2 (data processing unit 25).

That is, the data of the side selected by the selectors SEL00 to SELmn is written in the registers REG00 to REGmn at which the register write enable signals RWES00 to RWESmn are asserted.

Note that, the registers REG00 to REGmn may be flip-flops, RAMs, or any other devices able to store data. Further, in FIG. 13, registers are provided for all of the ports PRT0 to PRTn, but this is just an example. It is also possible to provide registers for part of the ports PRT0 to PRTn.

Figure 14:
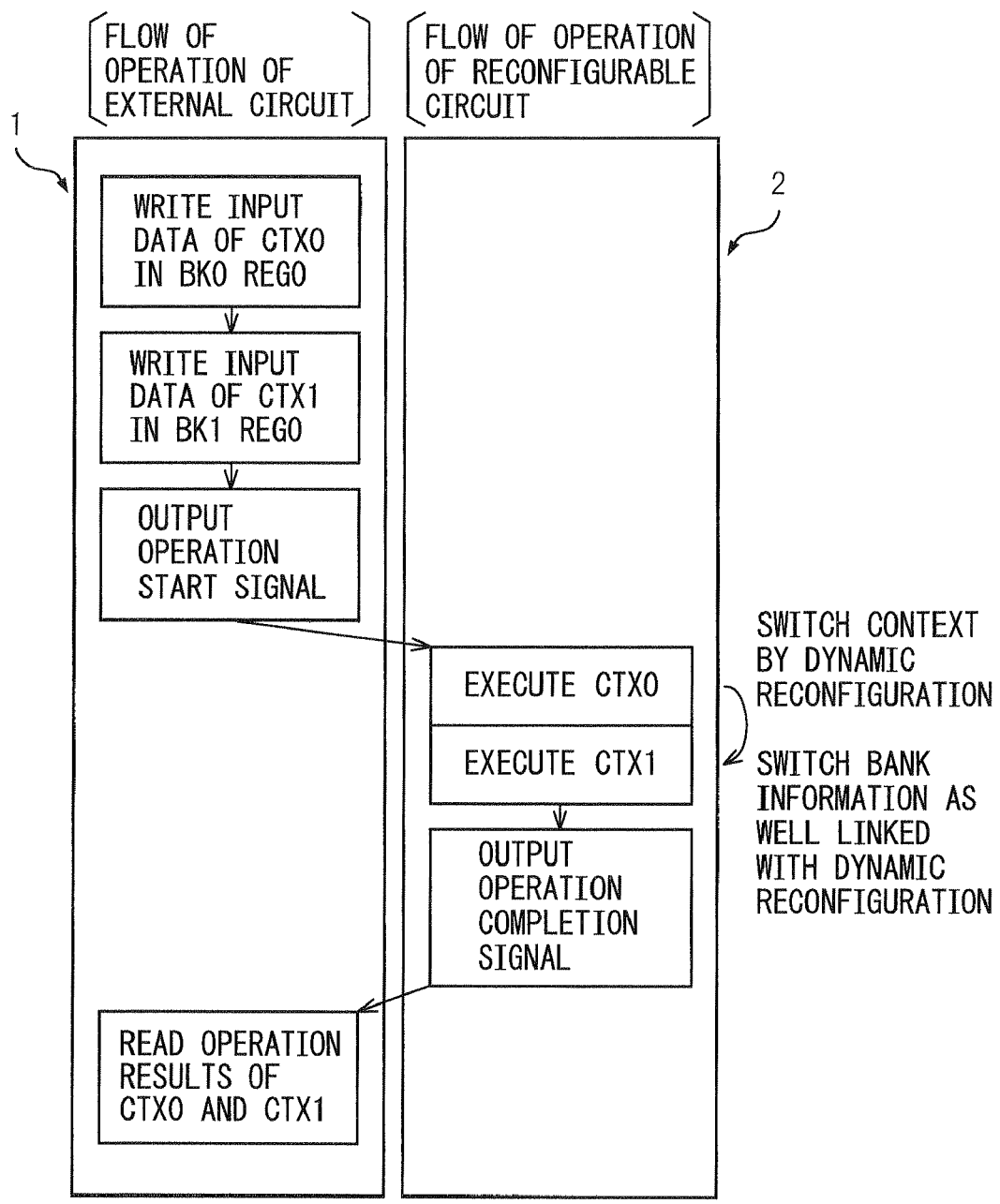
FIG. 14 is a view for explaining one example of the operation of the semiconductor integrated circuit of FIG. 10.

FIG. 14 is for explaining an example of the operation of the semiconductor integrated circuit of FIG. 10. The right side illustrates the flow of operation of the external circuit 1, while the right side illustrates the flow of operation of the reconfigurable circuit.

Here, FIG. 14 illustrates the flow of operation in the case of applying the present embodiment to the case where it is necessary to switch the input data of the port PRT0 between the contexts CTX0 and CTX1, that is, the case of the above-mentioned FIG. 3.

First, as illustrated in FIG. 14, the external circuit 1 writes the input data of the context CTX0 to the register REG00 of the port PRT0 of the bank BK0, writes the input data of the context CTX1 to the register REG10 of the port PRT0 of the bank BK1, and outputs the operation start signal OSS.

Here, the output of the bank BK0 (register REG00) is selected at the time of execution of processing under the context CTX0 by the register output bank selection information (control signal of the selector SELB0) of the port PRT0 included in the configuration data of the context CTX0. Further, the output of this bank BK0 (register REG00) becomes the operation input data of the context CTX0.

Next, after the execution of processing under the context CTX0 is completed, the context is switched by the dynamic reconfiguration and the processing under the context CTX1 is executed.

At this time, the output of the bank BK1 (register REG10) is selected at the time of execution of processing under the context CTX1 by the register output bank selection information (control signal of the selector SELB0) of the port PRT0 included in the configuration data of the context CTX1. Further, the output of this bank BK1 (register REG10) becomes the operation input data of the context CTX1.

Furthermore, after the execution of processing under the context CTX1 is completed, the operation completion signal OCS is output to the external circuit 1. Receiving the operation completion signal OCS, the external circuit 1 recognizes that the operations have been completed and reads out the operation results under the context CTX0 and the context CTX1 from the registers at which the respective operation results are held.

That is, the selector SELo is controlled by the output data selection signal ODSS and the output data ODAT is read out from the registers at which the operation results of the contexts CTX0 and CTX1 are held.

Figure 15:
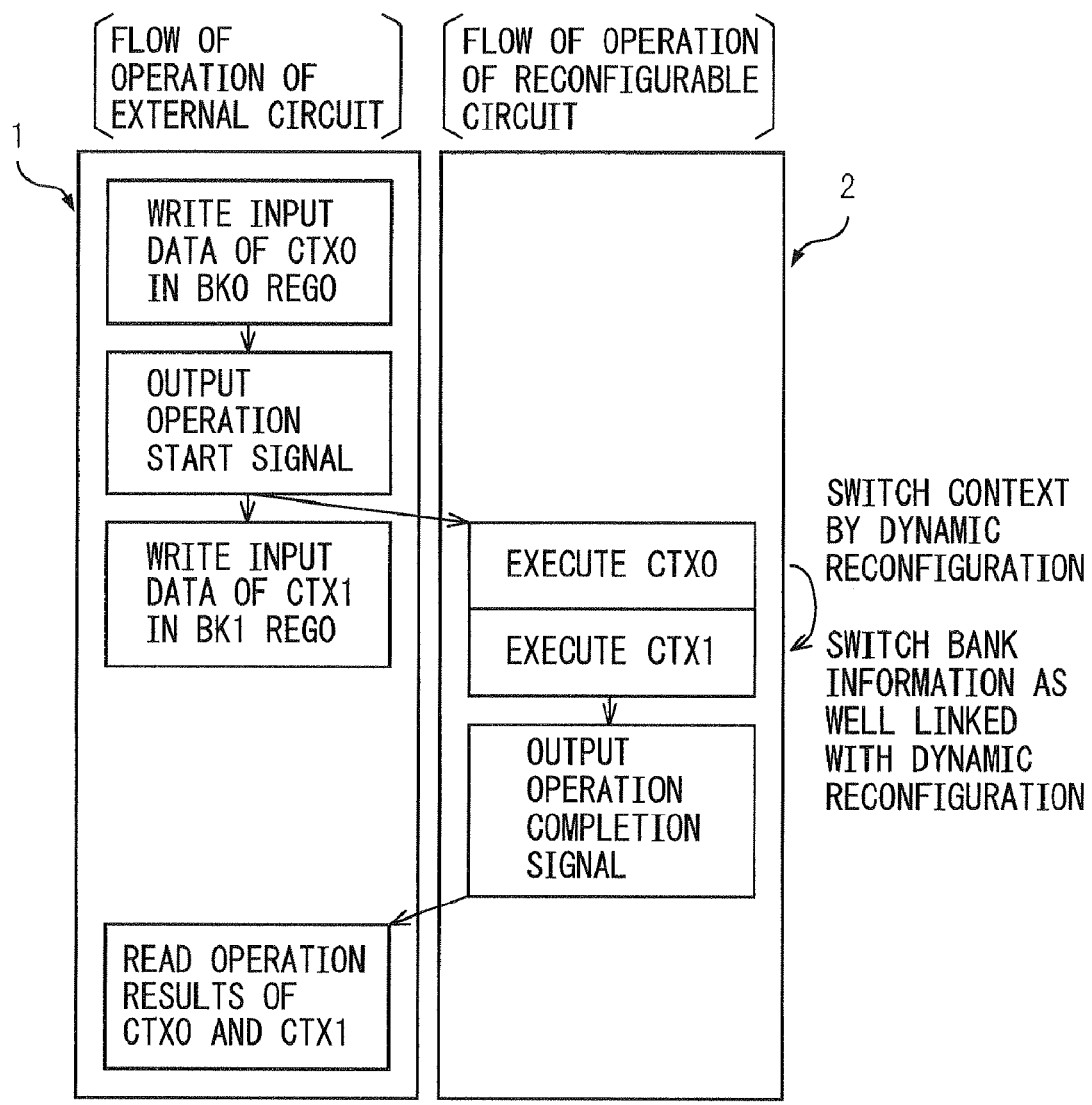
FIG. 15 is a view for explaining another example of the operation of the semiconductor integrated circuit of FIG. 10.

FIG. 15 is for explaining another example of the operation of the semiconductor integrated circuit of FIG. 10. The left sides illustrates the flow of operation of the external circuit 1, while the right side illustrates the flow of operation of the reconfigurable circuit 2. The flow of operation of this FIG. 15 executes in parallel the processings under the contexts CTX0 and CTX1 in the flow of operation of FIG. 14.

As illustrated in FIG. 15, when the time for writing the input data of the context CTX1 is sufficiently smaller than the time for executing processing under the operations of the context CTX0, the input data of the context CTX1 is written in the register REG10 of the port PRT0 of the bank BK1 in parallel to the execution of the processing under the context CTX0.

In this case, the input data of the context CTX1 is written in parallel with the time of execution of processing under the context CTX0, so if considering the time taken for the series of processing, the time for writing the input data of the context CTX1 becomes zero and a further effect of increase of speed may be obtained.

In this way, by providing the means for selecting the banks and the means for giving bank selection information to the individual context units and outputting the bank selection signal linked with dynamic reconfiguration in this way, it becomes possible to supply input data of the contexts without stopping execution of processing between contexts.

Figure 16:
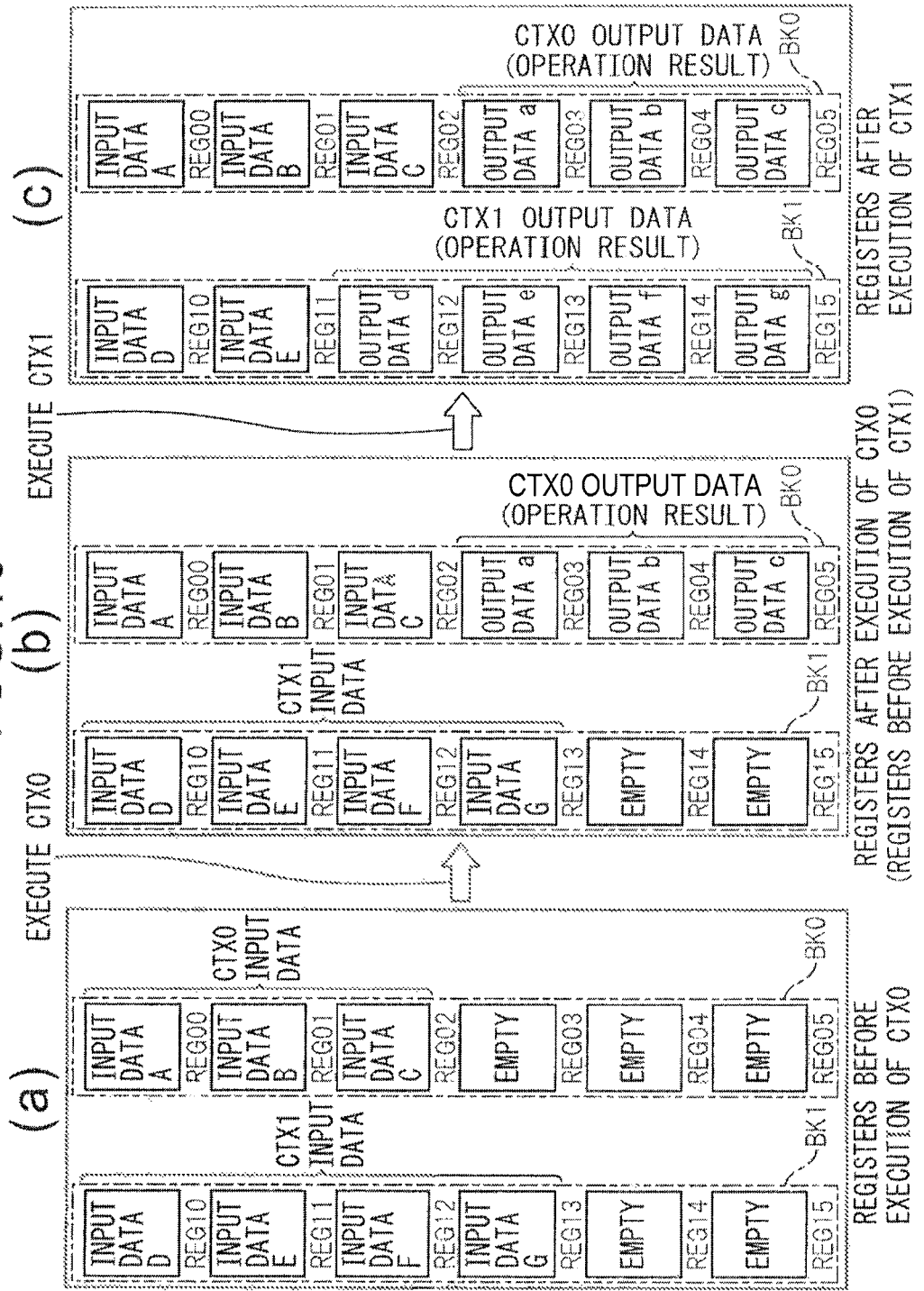
FIG. 16 is a view for explaining the operation in the reconfigurable circuit of FIG. 10 when the number of bits of input/output data exceeds a number of registers.

FIG. 16 is a view for explaining the operation when the number of bits of input/output data exceeds the number of registers in the reconfigurable circuit of FIG. 10.

First, as illustrated in FIG. 16(a), before execution of processing under the context CTX0, the input data A, B, and C of the context CTX0 are written in the registers REG00, REG01, and REG02 at the bank BK0. Similarly, before execution of processing under the context CTX0, the input data D, E, F, and G of the context CTX1 are written in the registers REG10, REG11, REG12, and REG13 at the bank BK1.

Further, when the input data of the context CTX0 and the context CTX1 finish being written, the operation start signal OSS is output to execute processing under the context CTX0.

Here, at the time of execution of processing under the context CTX0, the outputs of the registers REG00, REG01, and REG02 of the bank BK0 are selected by the register output bank selection information of the ports PRT0 to PRT5 included in the configuration data of the context CTX0. Due to this, the input data A, B, and C become the input data of operations of the context CTX0.

As illustrated in FIG. 16(b), the results of execution of the context CTX0, the data "a", "b", and "c", are held at the registers REG03, REG04, and REG05 of the bank BK0 by register output bank selection information of the ports PRT0 to PRT5 included in the configuration data of the context CTX0.

After execution of processing under the context CTX0 is completed, the context is switched by dynamic reconfiguration and processing under the context CTX1 is executed.

As illustrated in FIG. 16(c), due to the register output bank selection information of the ports PRT0 to PRT5 included in the configuration data of the context CTX1, at the time of execution of processing under the context CTX1, the outputs of the registers REG10, REG11, REG12, and REG13 of the bank BK1 are selected. Due to this, the input data D, E, F, and G becomes input data of the operations under the context CTX1.

Here, the input data D, E, F, and G of the context CTX1 are already written in the registers REG10, REG11, REG12, and REG13 of the bank BK1 at the time of execution of processing under the context CTX0. Further, linked with the switch of context by the dynamic reconfiguration, the registers REG10, REG11, REG12, and REG13 at the bank BK1 are selected, so it becomes possible to supply input data of the contexts without stopping execution between contexts.

As illustrated in FIG. 16(c), the results "d", "e", "f", and "g" of the context CTX1 are held at the registers REG12, REG13, REG14, and REG15 of the bank BK1 by the register output bank selection information of the ports PRT0 to PRT5 included in the configuration data of the context CTX1.

Note that, the reconfigurable circuit 2 outputs an operation completion signal OCS to the external circuit 1 after execution of processing under the context CTX1 is completed. Receiving the operation completion signal OCS, the external circuit 1 recognizes the completion of operation and reads out the operation results of the contexts CTX0 and CTX1 from the registers at which the operation results are held.

That is, due to the output data selection signal ODSS, the operation results "a", "b", and "c" of the context CTX0 held at the registers REG03 to REG05 of the bank BK0 and the operation results "d", "e", "f", and "g" of the context CTX1 held at the registers REG12 to REG15 of the bank BK1 are read.

In this regard, when there is no bank (when there is only BK0), if input of the context CTX0 held at the registers REG00, REG01, and REG02 is unnecessary, there is no problem even if overwriting the operation results of the context CTX1 in the registers REG00, REG01, and REG02. However, there are four results of the context CTX1 (data "d", "e", "f", and "g"), so the number of registers becomes insufficient.

Further, the registers REG03, REG04, and REG05 hold the operation results of the context CTX0. The external circuit 1 still does not read out the operation results "a", "b", and "c" of the context CTX0, so it is not possible to overwrite the results of processing under the context CTX1.

As opposed to this, according to the present embodiment, no problem such as that explained above occurs. Further, it is possible to handle things without an increase in the number of ports.

As explained in detail above, according to the present embodiment, the memories in the data processing unit are not used for storage of the input/output data of the operations, so address generating processing elements for reading and writing RAM addresses are unnecessary. It is possible to therefore eliminate shortages in processing elements due to this.

Further, the internal memories of the data processing unit are not used for storage of the input/output data of the operations, so processing elements for generating read/write control signals of the RAMs are not necessary. It is therefore possible to eliminate shortages of processing elements arising due to this. This also means no shortage in memory area in the internal memories of the data processing unit will arise.

Furthermore, not only are not the internal memories of the data processing unit but also not the address generating processing elements and R/W control signal generating processing element used, it is possible to eliminate the drop in connectivity between other processing elements and processing elements due to this.

Further, there is no need for newly increasing the memories in the data processing unit, the address generating processing elements, and the processing elements for generating read/write control signals.

For this reason, there is no need to increase the number of input/output ports of the data network for connecting the inputs/outputs of the RAMs and processing elements to the data network. Furthermore, the circuit scale of the data network does not increase either.

[Regarding Method of Setting Configuration Data]

Next, the method of setting the configuration data will be explained based on the example of programming of FIG. 17. FIG. 17 is a view illustrating an example of programming of content of operations performed under different contexts in the reconfigurable circuit of FIG. 10 and illustrates an example of programming by theoretical formulas.

In the example of FIG. 17, under the context CTX0 (#context0), the operation of (A+B)*C is performed and the result is entered for X. Furthermore, under the context CTX1 (#context1), the operation of (B−C)*D is performed and the result is entered for Y.

Further, software is used to input a file describing the theoretical formula and output the following information of the individual contexts as configuration data. This software will be called a "compiler" in the following explanation.

That is, the information output as configuration data (output information) includes assignment information of processing elements in the data processing unit 25 for obtaining operation results equivalent to a theoretical formula and operation instruction informations of the assigned processing elements.

Further, the output information includes network route selection information of the data network unit 24 for input/output of data between the assigned processing elements (route selection information).

Furthermore, the output information includes assignment information on which registers (ports and banks) of the data interface unit 24 to hold the input data A, B, C, and D at and assignment information on which registers of the data interface unit to hold the output data (operation results) X and Y at.

Further, the output information includes route selection information of the data network unit 24 for input/output of data between the registers in which input data is held and registers for holding output data in the input/output data interface unit 22 with the assigned processing elements.

Below, an example of the method of generation of these output information by the compiler (information output as configuration data) will be explained.

Here, the data processing unit 25 includes four processing elements (OP0 to OP3). These perform addition, subtraction, and multiplication.

Further, the input/output data interface unit 22 includes three ports for input/output (input ports INP0 to INP2 and output ports OTP0 to OTP2), while the register includes two banks (BK0, BK1) for each port.

That is, the input ports INP0 to INP2 and the output ports OTP0 to OTP2 are the same in number. As opposed to this, the registers REG00 to REG02 of the bank BK0 and the registers REG10 to REG12 of the bank BK1 are provided.

[Regarding Assignment of Processing Elements and Generation of Operation Instruction Information of Processing Elements]

First, configuration data for assigning the processing element OP0 for operations (addition) between the input data A and B under the context CTX0 and giving addition instructions to the processing element OP0 is output from the external circuit 1 to the configuration data holding unit 23.

Next, configuration data for assigning the processing element OP1 for operations (multiplication) between the output of the processing element OP0 and the input data C under the context CTX0 and giving multiplication instructions to the processing element OP1 is output from the external circuit 1 to the configuration data holding unit 23.

Furthermore, configuration data for assigning the processing element OP2 for operations (subtraction) between the input data B and C under the context CTX1 and giving subtraction instructions to the processing element OP2 is output from the external circuit 1 to the configuration data holding unit 23.

Further, configuration data for assigning the processing element OP3 for operations (multiplication) between the output of the processing element OP2 and the input data D under the context CTX1 and giving multiplication instructions to the processing element OP3 is output from the external circuit 1 to the configuration data holding unit 23. Due to this, processing elements are assigned and operation instruction information of processing elements are generated.

[Regarding Generation of Route Selection Information for Input/Output of Data Between Processing Elements]

First, for operations by the processing element OP1 using as input the results (A+B) of the processing element OP0 under the context CTX0, configuration data for connection of the output of the processing element OP0 and the input of the processing element OP1 is output from the external circuit 1 to the configuration data holding unit 23.

Further, for operations by the processing element OP3 using as input the results (B−C) of the processing element OP2 under the context CTX1, configuration data for connection of the output of the processing element OP2 and the input of the processing element OP3 is output from the external circuit 1 to the configuration data holding unit 23.

Due to the above, route selection information is generated for input/output of data between processing elements. Note that, [Regarding Generation of Route Selection Information Between Input/Output Data Interface Unit and Processing Elements] will be explained in detail later.

[Regarding Generation of Assignment Information of Register Holding Input/Output Data]

First, the generation of assignment information of the registers holding the input/output data will be explained. First, it is decided to hold the input data A, B, and C of the context CTX0 at the registers REG00 to REG02 of the bank BK0 corresponding to the input ports INP0 to INP2. Note that, the input data B and C are also utilized as the input data of the context CTX1.

Here, the input data A of the context CTX0 is not used after the completion of operations of the context CTX0 (in operations of the context CTX1). Therefore, it is judged that there is no problem even if overwriting the output data X and it is decided to hold the output data X of the context CTX0 at the register REG00 of the bank BK0 corresponding to the input port INP0.

Furthermore, based on the judgment illustrated in the following (J1) to (J4), it is decided to hold the input data D of the context CTX1 at the register REG10 of the bank BK1 corresponding to the input port INF0.

(J1) First, in the register REG00 of the bank BK0 corresponding to the input port INF0, the operation result X of the context CTX0 is stored, so may not be overwritten until the external circuit 1 reads it out.

(J2) Further, in the register REG01 of the bank BK0 corresponding to the input port INP1, the input data B of the context CTX0 is held. This is also the input data of the context CTX1, so may not be overwritten.

(J3) Furthermore, in the register REG02 of the bank BK0 corresponding to the input port INP2, the input data C of the context CTX0 is held. This is also the input data of the context CTX1, so may not be overwritten.

(J4) Accordingly, the registers REG00 to REG02 of the bank BK0 corresponding to the input ports IN0 to INP2 may not be used, so it is judged to use the register of the bank BK1. That is, it is determined to hold the input data D of the context CTX1 at the register REG10 of the bank BK1 corresponding to the input port INP0.

Further, at the time of completion of the operations at the context CTX1, not all of the input data is used, so it is judged that there is no problem even if overwriting the output data Y at the register REG01 of the bank BK0 corresponding to the input port INP1 at which the input data B of the context CTX0 is held. That is, it is determined to hold the output data Y of the context CTX1 at the register REG01 of the bank BK0 corresponding to the input port INP1.

From the above results of decision, the following information is output. First, at the ports PRT0 to PRTn of the input/output data interface unit 22, configuration data selecting which banks BK0 to BKm of held data to use for operations at the reconfigurable circuit 2 is output.

Here, the configuration data output from the external circuit 1 to the configuration data holding unit 23 includes register output bank selection information output from the configuration data holding unit 23 to the input/output data interface unit 22.

That is, as explained with reference to FIG. 13, the selectors SELB0 to SELBn are controlled to select the data held at the registers of the banks BK0 to BKm and output the register output bank selection information (configuration data) for output from the ports PRT0 to PRTn. Note that, the ports PRT0 to PRTn function as the input ports and output ports (input/output ports) of the input/output data interface unit 22.

Further, at the input ports of the input/output data interface unit 22, configuration data selecting at which banks to hold the results of operations at the reconfigurable circuit 1 is output.

That is, as explained with reference to FIG. 12, register bank selection signals BSS0 to BSSn of the ports PRT0 to PRTn input to the reconfigurable circuit write enable signal generation unit 213 are output.

Note that, the register bank selection signals BSS0 to BSSn correspond to the register input bank selection information of the ports for the register control unit 21 from the configuration data holding unit 23.

Furthermore, data for instructing at which ports PRT0 to PRTn of which banks BK0 to BKm of the registers REG00 to REGmn to write the input data A, B, C, and D is output to the external circuit 1.

Further, data for instructing at which ports of which banks of the registers to read the operation results X, Y from is output to the external circuit 1.

For example, for a program where the external circuit 1, that is, CPU, writes input data IDAT in the input/output data interface unit 22, a file indicating by address values to which ports of which banks of the registers it is necessary to write the input data in is output to the register control unit 21.

Alternatively, this may be realized by including in the program source of the CPU a file indicating by address values to which ports of which banks of the registers it is necessary to write the input data. Note that, the same is true for the read operation of the operation results.

[Regarding Generation of Route Selection Information Between Input/Output Data Interface Unit and Processing Elements]

Below, the results of assignment of the processing elements obtained by the above-mentioned [Regarding Assignment of Processing Elements and Generation of Operation Instruction Information of Processing Elements] will be explained based on the results of assignment of registers obtained by [Regarding Generation of Assignment Information of Registers Holding the Input/Output Data].

That is, based on the above-mentioned example, the generation of route selection information at the data network unit 24 for input/output of data between the input/output data interface unit 22 and the data processing unit 25 (processing elements) will be explained.

First, configuration data for connecting an input port for inputting input data A of the processing element 0 assigned for the operation of A+B and the output port (OPT0) of the input/output data interface unit 22 for outputting the input data A at the context CTX0 is output.

This configuration data is given to the data network unit 24 as network route selection information (route selection information) whereby the above connection is realized.

Similarly, configuration data of the data network unit 24 connecting the input port for input of input data B of the processing element 0 and the output port (OTP1) of the input/output data interface unit 22 from which the input data B is output is output.

Next, configuration data for connecting an input port for input data C of the processing element 1 assigned for the operation of the result (A+B) of the processing element 0 and the input data C and the output port (OPT2) of the input/output data interface unit 22 at the context CTX0 is output.

Furthermore, configuration data connecting the output port of the processing element 1 outputting the operation result X and the input port INP0 of the data interface unit holding the operation result X at the context CTX0 is output.

Further, configuration data for connecting an input port for inputting the input data B of the processing element 2 assigned for the operation of B−C and the output port OPT1 of the data interface unit to which the input data B is output at the context CTX1 is output.

Similarly, configuration data connecting the input port inputting the input data C of the processing element 2 and the output port OTP2 of the data interface unit at which the input data C is output is output.

Furthermore, configuration data for connecting an input port for input data D of the processing element 3 assigned for the operation of the result (B−C) of the processing element 2 and the input data D and the output port OPT0 of the data interface unit 22 at the context CTX1 is output.

Further, configuration data connecting the output port of the processing element 3 outputting the operation results Y at the context CTX1 and the input port INP1 of the data interface unit holding the operation results Y is output.

Further, these various types of configuration information for each context output by the compiler are written as configuration data in the configuration data holding unit 23 explained with reference to FIG. 11.

Note that, the configuration data is given through the configuration data holding unit 23 to the data network unit 24 as route selection information (network route selection information).

[Regarding Framework by which Banks are Switched Linked with Configuration Data]

Figure 18:
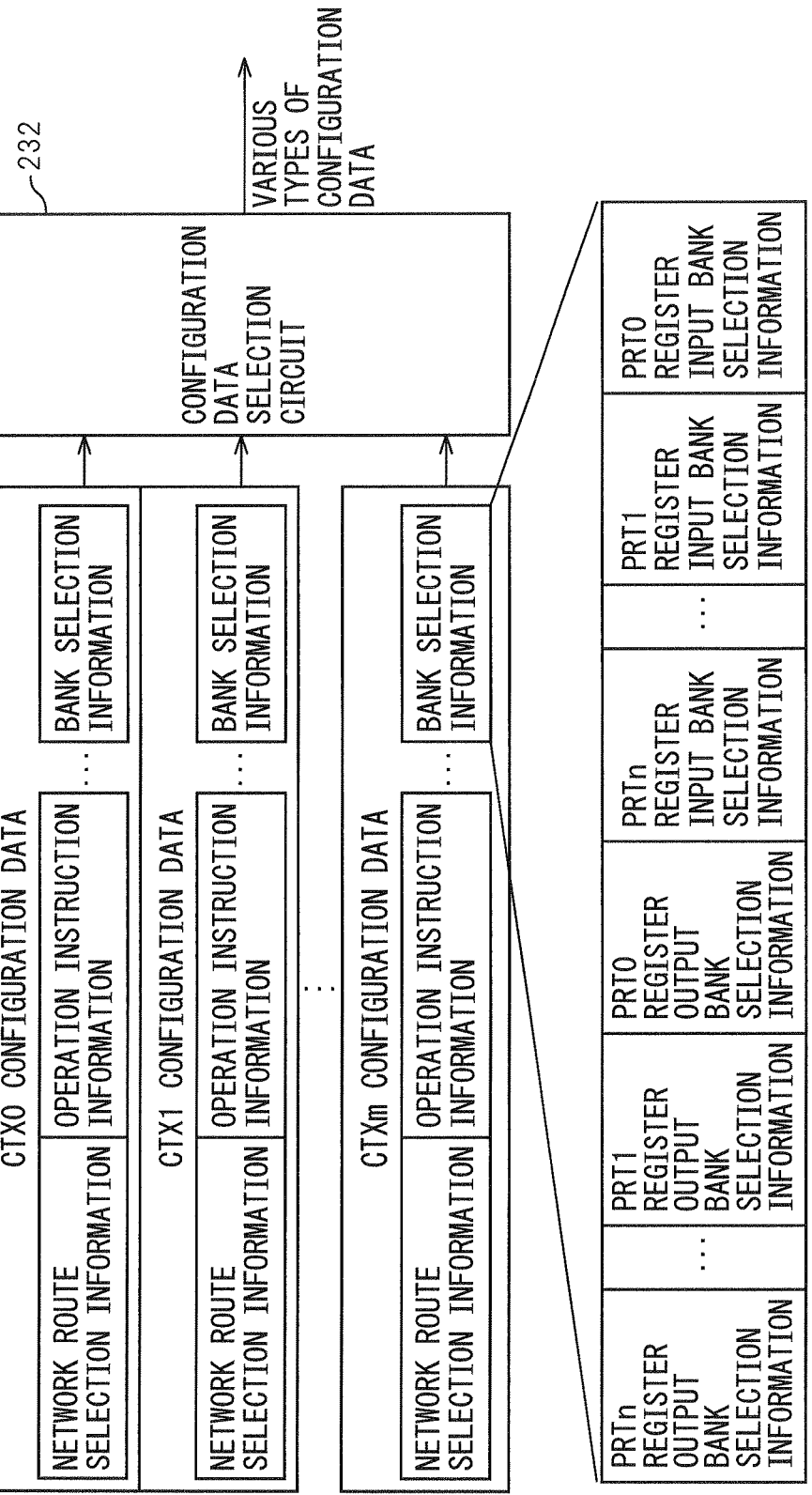
FIG. 18 is a block diagram illustrating in more detail the configuration data holding unit of FIG. 11.

FIG. 18 is a block diagram illustrating in more detail the configuration data holding unit of FIG. 11 and corresponds to FIG. 11 to which the programmable counter 231 and configuration data selection circuit 232 are added.

The programmable counter 231 designates the addresses of the memories at which configuration data of the context to be executed by the dynamic reconfiguration is stored.

The configuration data selection circuit 232 selects the data held at the addresses designated by the programmable counter 231 and outputs various types of configuration data including the register output bank selection information and the register input bank selection information.

Below, based on the example explained in the above-mentioned [Regarding Generation of Assignment Information of Registers Holding Input/Output Data], the framework by which the banks are switched linked with the configuration data will be explained.

First, the following information is stored in the register output bank selection information and register input bank selection information of the ports, part of the configuration data of the context CTX0:

Register output bank selection of port PRT0: 0 (select BK0)

Register output bank selection of port PRT1: 0 (select BK0)

Register output bank selection of port PRT2: 0 (select BK0)

Register input bank selection of port PRT0: 0 (select BK0)

Register input bank selection of port PRT1: Not used, so "don't care"

Register input bank selection of port PRT2: Not used, so "don't care"

Similarly, the following information is stored in the register output bank selection information and register input bank selection information of the ports, part of the configuration data of the context CTX1:

Register output bank selection of port PRT0: 1 (select BK1)

Register output bank selection of port PRT1: 0 (select BK0)

Register output bank selection of port PRT2: 0 (select BK0)

Register input bank selection of port PRT0: Not used, so "don't care"

Register input bank selection of port PRT1: 0 (select BK0)

Register input bank selection of port PRT2: Not used, so "don't care"

Here, the address value of a memory in which the configuration data of the context CTX0 is stored is made "0" and the address value of a memory at which the configuration data of the context CTX1 is stored is made "1".

First, when receiving the operation start signal OSS for starting the operations from the external circuit 1, the programmable counter 231 is reset to the address value (in this case, 0) at which the configuration of the context CTX0 is reset.

Further, the configuration data selection circuit 232, when receiving the operation start signal OSS, outputs the configuration data of the context CTX0 stored at the address value=0 counted by the programmable counter 231.

Furthermore, the register output bank selection information of the ports included in the configuration data of the context CTX0 is output to the input/output data interface unit 22.

Here, the register output bank selection information of the ports correspond to the selection signals of the selectors SELB0 to SELB in the above-mentioned FIG. 13. Due to this, the input data A, B, and C held at the registers REG00, REG01, and REG02 of the bank BK0 of the ports are output from the ports PRT0, PRT1, and PRT2 of the input/output data interface unit 22.

The operation results of the context CTX0 are input to the port PRT0 of the input/output data interface unit 22 by the route selection of the data network unit 24.

The register input bank selection information of the ports (register bank selection signals BSS0 to BSSn) are input to the reconfigurable circuit write enable signal generation unit 213 at the register control unit 21 illustrated in the above-mentioned FIG. 12.

Note that, due to the register input bank selection information of the ports, finally, the register write enable signals RWES (RWES00 to RWESSmn) etc. output from the register control unit 21 are controlled.

Further, the register write enable signals RWES (RWES00 to RWESSm0) are asserted, for example, at the timings when the operation results reach the registers of the port PRT0 whereupon data is written at predetermined registers of the port PRT0.

Further, the programmable counter 231 recognizes that the operations of the context CTX0 have been completed, increments the counter value, and outputs the address value 1 at which the configuration data of the context CTX1 is stored.

Furthermore, the configuration data selection circuit 232 outputs the configuration data of the context CTX1 stored at the address value=1 illustrated by the programmable counter 231.

Further, the register output bank selection information of the ports included in the configuration data of the context CTX1 is output to the input/output data interface unit 22.

Due to this, the input data D, B, and C held at the registers of the banks BK1, BK0, and BK0 are output from the ports PRT0, PRT1, and PRT2 of the input/output data interface unit 22.

The operation results of the context CTX1 are input to the port PRT1 of the input/output data interface unit 22 by the route selection of the data network unit 24.

The register input bank selection information (register bank selection signals BSS0 to BSSn) of the ports are input to the reconfigurable circuit write enable signal generation unit 213 in the register control unit 21 and control the register write enable signals RWES (RWES00 to RWESSmn) etc.

Further, the register write enable signals RWES (RWES01 to RWESSm1) are, for example, asserted at the timings when the operation results reach the registers of the port PRT1 whereby data is written in predetermined registers of the port PRT1.

In this way, it is possible to switch the banks of the ports (registers) linked with the configuration data of the contexts.

In the above, the reconfigurable circuit is, for example, used as an accelerator of the CPU or other external circuit and includes a dynamic reconfigurable circuit dynamically changing its circuit configuration along with time based on the context from the CPU.

Further, the external circuit comprising the CPU and the reconfigurable circuit used as the accelerator of the CPU may be formed at a single chip LSI (large scale integrated circuit). Of course, it is also possible to form the external circuit and reconfigurable circuit as separate semiconductor chips.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention.

Although the embodiments of the present invention have been described in detail, it should be understood that the various changes, substitutions, and alterations could be made hereto without departing from the spirit and scope of the invention.

What is claimed is:

1. A reconfigurable circuit comprising:
   a plurality of processing elements; and
   an input/output data interface unit implemented as a first portion of said reconfigurable circuit, said input/output data interface unit configured to hold operation input data which is input to said plurality of processing elements and operation output data which is output from said plurality of processing elements, and configured to control connections of said plurality of processing elements for each context of a plurality of contexts,
   wherein said input/output data interface unit comprises:
      a plurality of ports;
      a plurality of multiplexers, wherein each multiplexer is coupled to a corresponding port of the plurality of ports; and
      a matrix of registers having n+1 rows and m+1 columns of registers (m and n each being integers greater than 0) configured to be connected to said plurality of multiplexers such that the only registers connected to each multiplexer of the plurality of multiplexers is a corresponding row of m+1 registers, wherein the registers are configured to be allocated to a particular context of the plurality of contexts based on particular configuration data associated with that particular context, wherein the particular configuration data specifies particular register input bank selection information and particular register output bank selection information for that particular context, and wherein the particular register input bank selection information is distinct from the particular register output bank selection information.

2. The reconfigurable circuit according to claim 1, further comprising:
   a data processing unit implemented as a second portion of said reconfigurable circuit, said data processing unit including said plurality of processing elements;
   a data network unit implemented as a third portion of said reconfigurable circuit, said data network unit configured to control the connection of said plurality of ports and said plurality of processing elements; and
   a register control unit implemented as a fourth portion of said reconfigurable circuit, said register control unit configured to control the registers of said input/output data interface unit.

3. The reconfigurable circuit according to claim 2, wherein configuration data is held for each said context of the plurality of contexts, wherein the configuration data for each said context includes register input bank selection information of the ports configured to indicate to which banks of registers of the ports to write the operation output data from said data processing unit; and said register control unit is configured to generate a reconfigurable circuit write enable signal for a register of a target bank for a write operation of said ports based on said register input bank selection information of the ports.

4. The reconfigurable circuit according to claim 3, wherein the configuration data for each said context includes register output bank selection information of the ports configured to indicate from which banks of registers of the ports to output the operation input data to said data processing unit; and
   said input/output data interface unit further comprises a first selector configured to select a target bank for output of data from the ports based on the register output bank selection information of the ports.

5. The reconfigurable circuit according to claim 4, further comprising a configuration data holding unit implemented as a fifth portion of said reconfigurable circuit, said configuration data holding unit comprising:
   a memory configured to store the configuration data of each of said contexts;
   a programmable counter configured to designate an address of said memory; and
   a configuration data selection circuit configured to select data held at an address designated by said programmable counter and to output various types of configuration data including said register output bank selection information and said register input bank selection information of the ports.

6. The reconfigurable circuit according to claim 3, wherein said register control unit further comprises:
   a first logic circuit configured to receive said reconfigurable circuit write enable signal and an external circuit write enable signal and to assert a register write enable signal in a corresponding register when one of the enable signals is asserted; and
   an external/internal write data selection signal generation circuit configured to select said operation output data when said reconfigurable circuit write enable signal is asserted and to select operation input data from a particular external circuit when said external circuit write enable signal is asserted.

7. The reconfigurable circuit according to claim 6 wherein said input/output data interface unit further comprises a second selector configured to select data to be held at said matrix of registers from said operation input data or said operation output data based on said external/internal write data selection signal.

8. The reconfigurable circuit according to claim 6, wherein:
said register control unit further comprises an output data selection signal generation circuit configured to generate an output data selection signal for selecting a register output corresponding to an address value from address information indicating a target of registers from said external circuit; and
said input/output data interface unit further comprises a third selector configured to select register output data based on said output data selection signal and to output said register output data to the external circuit.

9. The reconfigurable circuit according to claim 6, wherein said register control unit further comprises:
an external circuit/reconfigurable circuit simultaneous write detection unit implemented as a sixth portion of said reconfigurable circuit, said external circuit/reconfigurable circuit simultaneous write detection unit configured to detect when said reconfigurable circuit write enable signal and said external circuit write enable signal are simultaneously asserted; and
a priority judgment unit implemented as a seventh portion of said reconfigurable circuit, said priority judgment unit configured to judge priority based on an external circuit/reconfigurable circuit write priority signal defining which write operation from said particular external circuit to give priority to when said reconfigurable circuit write enable signal and said external circuit write enable signal are simultaneously asserted.

10. The reconfigurable circuit according to claim 9, wherein said external circuit/reconfigurable circuit simultaneous write detection unit detects when said reconfigurable circuit write enable signal and said external circuit write enable signal are simultaneously asserted and outputs a simultaneous write detection signal as error information to said particular external circuit.

11. The reconfigurable circuit according to claim 1, wherein said reconfigurable circuit is a dynamic reconfigurable circuit configured to dynamically change its circuit configuration along with time based on a context from said plurality of contexts.

12. A semiconductor integrated circuit comprising:
a reconfigurable circuit; and
an external circuit,
wherein said reconfigurable circuit comprises:
a plurality of processing elements; and
an input/output data interface unit implemented as a first portion of said reconfigurable circuit, said input/output data interface unit configured to hold operation input data which is input to said plurality of processing elements and operation output data which is output from said plurality of processing elements, and configured to control connections of said plurality of processing elements for each context of a plurality of contexts;
said input/output data interface unit comprises a plurality of ports, a plurality of multiplexers, wherein each multiplexer is coupled to a corresponding port of the plurality of ports, and a matrix of registers having n+1 rows and m+1 columns of registers (m and n each being integers greater than 0) configured to be connected to said plurality of multiplexers such that the only registers connected to each multiplexer of the plurality of multiplexers is a corresponding row of m+1 registers, wherein the registers are configured to be allocated to a particular context of the plurality of contexts based on particular configuration data associated with that particular context, wherein the particular configuration data specifies particular register input bank selection information and particular register output bank selection information for that particular context, and wherein the particular register input bank selection information is distinct from the particular register output bank selection information; and
a register control unit implemented as a second portion of said reconfigurable circuit, said register control unit configured to control the registers of said input/output data interface unit and configured to receive address information from said external circuit indicating a register of the matrix of registers and a write control signal instructing a write operation from said external circuit and to output an external circuit write enable signal output to the register.

13. The semiconductor integrated circuit according to claim 12, wherein said reconfigurable circuit further comprises:
a data processing unit implemented as a third portion of said reconfigurable circuit, said data processing unit including said plurality of processing elements; and
a data network unit implemented as a fourth portion of said reconfigurable circuit, said data network unit configured to control the connection of said plurality of ports and said plurality of processing elements;
wherein configuration data is held for each said context of the plurality of contexts, wherein the configuration data for each said context includes register input bank selection information of the ports configured to indicate to which banks of registers of the ports to write the operation output data from said data processing unit; and
said register control unit configured to generate a reconfigurable circuit write enable signal for a register of a target bank for a write operation of said ports based on register input bank selection information of said ports, and comprising:
a first logic circuit configured to receive said reconfigurable circuit write enable signal and said external circuit write enable signal and to assert a register write enable signal in a corresponding register when one of the enable signals is asserted; and
an external/internal write data selection signal generation circuit configured to select said operation output data when said reconfigurable circuit write enable signal is asserted and to select operation input data from said external circuit when said external circuit write enable signal is asserted.

14. The semiconductor integrated circuit according to claim 13, wherein said input/output data interface unit further comprises a second selector configured to select data to be held at said matrix of registers from said operation input data or said operation output data based on said external/internal write data selection signal.

15. The semiconductor integrated circuit according to claim 13, wherein:
- said register control unit further comprises an output data selection signal generation circuit configured to generate an output data selection signal for selecting a register output corresponding to an address value from address information indicating a target of registers from said external circuit; and
- said input/output data interface unit further comprises a third selector configured to select register output data based on said output data selection signal and to output said register output data to the external circuit.

16. The reconfigurable circuit according to claim 13, wherein the configuration data for each said context further includes register output bank selection information of the ports configured to indicate from which banks of registers of the ports to output the operation input data to said data processing unit.

17. The semiconductor integrated circuit according to claim 16, further comprising a configuration data holding unit implemented as a fifth portion of said reconfigurable circuit, said configuration data holding unit comprising:
- a memory configured to store the configuration data of each of said contexts;
- a programmable counter configured to designate an address of said memory; and
- a configuration data selection circuit configured to select data held at an address designated by said programmable counter and to output various types of configuration data including said register output bank selection information and said register input bank selection information.

18. The semiconductor integrated circuit according to claim 12, wherein said external circuit is a CPU, and said reconfigurable circuit is an accelerator of said CPU.

19. The semiconductor integrated circuit according to claim 18, wherein said CPU and said accelerator are formed as a single chip large scale integrated circuit (LSI).

20. The semiconductor integrated circuit according to claim 12, wherein the plurality of ports is configured to output data stored in a corresponding plurality of registers from a single column of the m+1 columns of registers.

21. The semiconductor integrated circuit according to claim 20, further comprising n+1 selectors configured to select the single column of registers.

* * * * *